US 8,655,193 B2

(12) United States Patent
Kikuchi

(10) Patent No.: US 8,655,193 B2
(45) Date of Patent: Feb. 18, 2014

(54) OPTICAL MULTI-LEVEL TRANSMISSION SYSTEM

(75) Inventor: Nobuhiko Kikuchi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/201,278

(22) PCT Filed: Mar. 2, 2009

(86) PCT No.: PCT/JP2009/054353
§ 371 (c)(1),
(2), (4) Date: Aug. 12, 2011

(87) PCT Pub. No.: WO2010/100763
PCT Pub. Date: Sep. 10, 2010

(65) Prior Publication Data
US 2011/0305457 A1    Dec. 15, 2011

(51) Int. Cl.
*H04B 10/06* (2011.01)
*H04B 10/00* (2013.01)

(52) U.S. Cl.
USPC ............ 398/208; 398/202; 398/203; 398/159

(58) Field of Classification Search
USPC .................................. 398/202–214, 158, 159
See application file for complete search history.

(56) References Cited

U.S. PATENT DOCUMENTS

| | | |
|---|---|---|
| 2003/0165112 A1 | 9/2003 | Noda |
| 2004/0042802 A1* | 3/2004 | Ho et al. ........................ 398/208 |
| 2004/0136475 A1 | 7/2004 | Kobayashi |
| 2004/0218706 A1 | 11/2004 | Bougeard et al. |
| 2006/0285854 A1 | 12/2006 | Sun et al. |
| 2006/0285855 A1 | 12/2006 | Sun et al. |
| 2007/0092259 A1 | 4/2007 | Bontu et al. |
| 2007/0092260 A1 | 4/2007 | Bontu et al. |

(Continued)

FOREIGN PATENT DOCUMENTS

| | | |
|---|---|---|
| JP | 9-307529 A | 11/1997 |
| JP | 2003-204365 A | 7/2003 |

(Continued)

OTHER PUBLICATIONS

R. A. Griffin, et al., "10 Gb/s Optical Differential Quadrature Phase Shift Key (DQPSK) Transmission using GaAs/AlGaAs Integration", Optical Fiber Conference (OFC), Mar. 2002. (Three (3) pages).

(Continued)

*Primary Examiner* — Daniel Dobson
(74) *Attorney, Agent, or Firm* — Crowell & Moring LLP

(57) ABSTRACT

Provided is an optical multilevel transmission system, comprising at least one optical multilevel transmitter for transmitting an optical multilevel signal obtained and an optical multilevel receiver for receiving the optical multilevel signal. The received optical multilevel signal has a larger noise in an angular direction than in a radial direction. The optical multilevel receiver sets, in a symbol decision of the received optical multilevel signal demodulated on the complex plane, for positions of all or some of ideal signal points, a width in the angular direction of a decision area, to which each of the ideal signal points belongs and which is measured along a circumference of a circle centered at an origin and passing through a center of the each of the ideal signal points, larger than a width in the angular direction of a decision area defined based on a Euclidean distance.

8 Claims, 15 Drawing Sheets

(56) References Cited

U.S. PATENT DOCUMENTS

| | | | |
|---|---|---|---|
| 2007/0206963 A1* | 9/2007 | Koc | 398/202 |
| 2008/0056412 A1* | 3/2008 | Bock et al. | 375/341 |
| 2008/0199182 A1 | 8/2008 | Ooi et al. | |
| 2008/0232816 A1 | 9/2008 | Hoshida et al. | |
| 2009/0208224 A1* | 8/2009 | Kikuchi | 398/141 |
| 2010/0239267 A1 | 9/2010 | Kikuchi | |
| 2011/0305457 A1* | 12/2011 | Kikuchi | 398/65 |

FOREIGN PATENT DOCUMENTS

| | | | |
|---|---|---|---|
| JP | 2004-208155 A | | 7/2004 |
| JP | 2004-528781 A | | 9/2004 |
| JP | 2005-86548 A | | 3/2005 |
| JP | 2005-333545 A | | 12/2005 |
| JP | 2008-167126 A | | 7/2008 |
| JP | 2008-193257 A | | 8/2008 |
| JP | 2008-263590 A | | 10/2008 |
| WO | WO 2007/045072 A1 | | 4/2007 |
| WO | WO 2007/132503 A1 | | 11/2007 |
| WO | WO 2007132503 A1 | * | 11/2007 |
| WO | WO 2009/060920 A1 | | 5/2009 |

OTHER PUBLICATIONS

N. Kikuchi, et al., "First experimental demonstration of single-polarization 50-Gbit/s 32-level (QASK and 8-DPSK) incoherent optical multilevel transmission", Proc. Optical Fiber Communication Conf. (OFC/NFOEC), Anaheim, CA, Mar. 2007, PDP21. (Three (3) pages).

J. Hongou, et al. "1 Gsymbol/s, 64 QAM coherent optical transmission over 150 km with a spectral efficiency of 3 Bit/s/Hz", Proc. Optical Fiber Communication Conf. (OFC/NFOFEC), Anaheim, CA, Mar. 2007, paper OMP3. (Three (3) pages).

M. G Taylor, "Coherent detection method using DSP to demodulate signal and for subsequent equalisation of propagation impairments", European Conference on Optical Communication (ECOC) 2003, Paper WE4.P.111. (Two (2) pages).

N. Kikuchi, et al. "Optical dispersion-compensation free incoherent multilevel signal transmission over single-mode fiber with digital pre-distortion and phrase pre-integration techniques", ECOC 2008, Sep. 21-25, 2008, vol. 2-49, pp. 1-2, Brussels, Belgium.

International Search Report dated May 12, 2009 including English-language translation (Six (6) pages).

Japanese-language Office Action dated Aug. 13, 2013 (four (4) sheets).

* cited by examiner

DEFINITION OF AMPLITUDE r(n)
AND PHASE φ(n)

QUATERNARY PHASE SHIFT KEYING
MODULATION
(QPSK)

SIX-LEVEL PHASE SHIFT KEYING
MODULATION
(6PSK)

16-LEVEL QUATERNARY
AMPLITUDE MODULATION
(16QAM)

QUATERNARY
PHASE SHIFT KEYING
MODULATION

SIX-LEVEL
PHASE SHIFT KEYING
MODULATION

16-LEVEL
QUATERNARY AMPLITUDE
MODULATION

6QAM SIGNAL IN THIS INVENTION

DECISION AREA DEFINED BY THE INVENTED
NON-EUCLIDIAN DISTANCE WITH RADIAL WEIGHT -1

DECISION AREA DEFINED BY THE INVENTED
NON-EUCLIDIAN DISTANCE WITH RADIAL WEIGHT -2

LINEAR APPROXIMATION OF DECISION AREA

SIGNAL POINT ALLOCATION AND DECISION AREA
CORRESPONDING TO LARGER AMPLITUDE DIFFERENCE

CONVENTIONAL DECISION AREA
FOR 6QAM SIGNAL

CONVENTIONAL DECISION AREA
FOR 8QAM SIGNAL

CONVENTIONAL DECISION AREA
FOR 16QAM SIGNAL

ISOTROPIC NOISE + EUCLIDEAN DISTANCE (CONVENTIONAL)

ANISOTROPIC NOISE IN RADIAL DIRECTION
+ NON-EUCLIDEAN DISTANCE (THIS INVENTION)

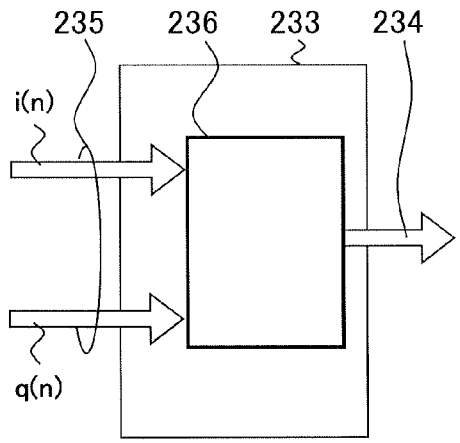
SYMBOL DECISION CIRCUIT
IN THIS INVENTION
Fig. 13A
EXAMPLE INTERNAL CONFIGURATION
OF DECISION TABLE 236
Fig. 13B
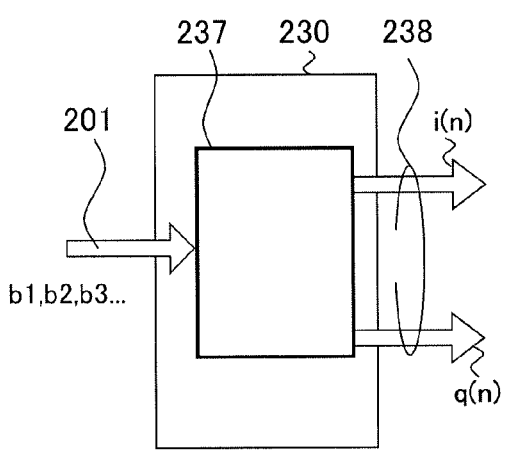
MULTILEVEL ENCODER
IN THIS INVENTION
(6QAM CASE)
Fig. 14A
EXAMPLE INTERNAL CONFIGURATION
OF MAPPING TABLE 237
Fig. 14B

OPTICAL MULTI-LEVEL TRANSMISSION SYSTEM

BACKGROUND OF THE INVENTION

This invention relates to an optical information transmission technology, and more particularly, to an optical field transmitter and an optical field transmission system suitable for transmission/reception of an optical multilevel signal transmitted via an optical fiber.

The amount of information that can be transmitted (transmission capacity) via one optical fiber has reached its capacity limit because a wavelength bandwidth of an optical fiber amplifier has been almost used up owing to an increase in number of wavelength channels and a speedup of a modulation speed of an optical signal. In order to further expand the transmission capacity of the optical fiber, it is necessary to improve efficiency of the frequency bandwidth usage by devising a signal modulation method so that a large number of optical signals are packed in a limited frequency bandwidth.

In the world of radio communications, since 1960s, a multilevel modulation technology has realized transmission at such high efficiency that frequency use efficiency exceeds 10. There have conventionally been many studies of multilevel modulation, which is regarded as promising also in the field of optical fiber transmission. For example, R. A. Griffin, et al., "10 Gb/s Optical Differential Quadrature Phase Shift Key (DQPSK) Transmission using GaAs/AlGaAs Integration", OFC2002, paper PD-FD6, 2002 reports quadrature phase shift keying (QPSK) for performing four-level phase modulation. In addition, N. Kikuchi, K. Mandai, K. Sekine and S. Sasaki, "First experimental demonstration of single-polarization 50-Gbit/s 32-level (QASK and 8-DPSK) incoherent optical multilevel transmission", in Proc. Optical Fiber Communication Conf. (OFC/NFOEC), Anaheim, Calif., March 2007, PDP21. reports 32-level phase and amplitude modulation that is a combination of four-level amplitude modulation and eight-level phase modulation.

FIGS. 1A to 1D are diagrams describing a complex plane used for the optical transmission and illustrating signal constellations of various known modulation methods. On the complex phase plane (or complex plane, phase plane, IQ plane), there are plotted signal points of various multilevel signals (complex display of an optical field at a decision timing).

FIG. 1A is an explanatory diagram illustrating a signal point on the IQ plane according to a conventional technology.

As illustrated in FIG. 1A, each of the signal points may be displayed by complex Cartesian coordinates (IQ coordinates) or polar coordinates represented by an amplitude r(n) and a phase $\phi(n)$ illustrated in FIG. 1A.

FIG. 1B is an explanatory diagram illustrating a signal constellation of quaternary phase shift keying (QPSK) according to a conventional technology.

In FIG. 1B, four ideal signal points (symbols) used for transmitting multilevel signals are displayed on the complex plane. The respective ideal signal points have a fixed amplitude and phase angles $\phi(n)$ arranged at four positions 0, $\pi/2$, $\pi$, and $-\pi/2$. When one of the four symbols is transmitted, 2-bit information (00, 01, 11, 10) may be transmitted per symbol. It should be noted that, in a case where this signal is received directly (incoherently) by using optical delay detection, differential quaternary phase shift keying (DQPSK) in which differential precoding is performed in advance is generally employed. However, the signal constellation of QPSK and the signal constellation of DQPSK are the same, and hence QPSK and DQPSK are not distinguished herein.

FIG. 1C is an explanatory diagram illustrating six-level phase modulation in which the phase angles $\phi(n)$ are increased to six levels (0, $\pi/3$, $2\pi/3$, $-\pi$, $-2\pi/3$, $-\pi/3$) having spacing of $\pi/3$ according to a conventional technology.

As illustrated in FIG. 1C, with the six-level phase modulation, information of about 2.58 bits can be transmitted per symbol. However, there have been few examples in which the six-level phase modulation is used in optical communication because of the difficulty of optical delay detection and the mediocre amount of information.

FIG. 1D is an explanatory diagram illustrating sixteen-level quaternary amplitude modulation (16QAM) widely used in radio communications according to a conventional technology.

As illustrated in FIG. 1D, the 16QAM, in which ideal signal points are arranged in lattice, allows four-bit information to be transmitted per symbol. In the example illustrated in FIG. 1D, the Q-axis coordinate represents a value of upper two bits (10xx, 11xx, 01xx, 00xx), and the I-axis coordinate represents a value of lower two bits (xx10, xx11, xx01, xx00). It is known that in this signal constellation, a distance between the signal points increases to improve the receiver sensitivity. It is reported that in optical communications, the quadrature amplitude modulation similar to 16QAM can be realized by using a coherent optical receiver. For example, J. Hongou, K. Kasai, M. Yoshida and M. Nakazawa, "1 Gsymbol/s, 64 QAM Coherent Optical Transmission over 150 km with a Spectral Efficiency of 3 Bit/s/Hz", in Proc. Optical Fiber Communication Conf. (OFC/NFOFEC), Anaheim, Calif., March 2007, paper OMP3. reports an experimental example of transmission/reception of a 64QAM signal. The coherent receiver employs a format that uses a local light source disposed within the receiver in order to detect the phase angle of the optical signal.

Here, description is made of a coherent reception format which is one of conventional technologies for an optical multilevel receiver, for example, a coherent optical field receiver reported in M. G. Taylor, "Coherent detection method using DSP to demodulate signal and for subsequent equalization of propagation impairments", paper We4. P. 111, ECOC 2003, 2003.

FIG. 2 is a block diagram illustrating a coherent optical field receiver of a polarization diversity type, which simultaneously receives information on two polarizations of the optical signal according to a conventional technology.

An optical multilevel signal transmitted through an optical fiber transmission line is amplified by an optical amplifier 117, and then input to a polarization beam splitter 102-1 as an input optical signal 101. The input optical signal 101 is split into a horizontal (S) polarization component 105 and a vertical (P) polarization component 106, which are input to coherent field detector front ends 100-1 and 100-2, respectively.

In the coherent field detector front end 100-1, a local laser source 103 which emits an optical signal having a wavelength substantially the same as the input optical signal 101 is used as a reference of an optical phase. Local light 104-1 output from the local laser source 103 is split by a polarization beam splitter 102-2 into two beams of local light 104-2 and local light 104-3, which are input to the coherent field detector front ends 100-1 and 100-2, respectively.

Inside the coherent field detector front end 100-1, an optical phase diversity circuit 107 combines the S polarization component 105 of the input optical signal and the local light 104-2 to generate an inphase (I) component output light 108 including an inphase component of the local light and the optical multilevel signal, and a quadrature (Q) component output light 109 including a quadrature component of the local light and the optical multilevel signal. The inphase (I) component output light 108 and the quadrature (Q) component output light 109 are received by balanced optical detectors 110-1 and 110-2, respectively, to be converted into electric signals, which are then time-sampled by A/D converters 111-1 and 111-2 to become digitized output signals 112-1 and 112-2, respectively.

In the following description, as illustrated in FIG. 1A, the optical field of the input optical signal 101 is represented as $r(n)\exp(j\phi(n))$, and the optical field of the local light 104-2 and the local light 104-3 is assumed to be 1 (originally, an optical frequency component is included, but the optical frequency component is omitted). Here, "r" represents an amplitude of the optical field, "$\phi$" represents a phase of the optical field, and "n" represents a sampling number. The local light 104-2 and the local light 104-3 actually have random phase noise and a slight difference frequency component with respect to signal light. However, the phase noise and the difference frequency component exhibit temporally slow phase rotation, and may be eliminated by digital signal processing. Therefore, the phase noise and the difference frequency component are ignored.

The balanced optical detectors 110-1 and 110-2 each perform homodyne detection on the input optical signal 101 with the local light 104-2, and output an inphase component and a quadrature component of the optical field of the optical multilevel signal 101 by taking the local light 104-2 and the local light 104-3 as a reference, respectively. Therefore, the output signal 112-1 from the A/D converter 111-1 is $I(n)=r(n)\cos(\phi(n))$, and the output signal 112-2 from the A/D converter 111-2 is $Q(n)=r(n)\sin(\phi(n))$. However, for simplification, constants including a conversion factor are all set to "1".

As described above, the coherent optical field receiver can easily obtain all information pieces indicating the optical field $r(n)\exp(\phi(n))$ (both I component and Q component) from the input optical signal 101, thereby allowing the reception of a complex modulated optical multilevel signal.

A digital signal processing circuit 113, which is a complex field signal processing circuit, gives an inverse function to a linear degradation (for example, chromatic dispersion) or the like exerted upon the optical signal during transmission, to thereby enable cancellation of influences of the linear degradation. Further, processings such as retiming and resampling are performed to output a demodulated received field 116-1.

The coherent field detector front end 100-1 can obtain field information on the S polarization component of the input optical signal 101 as described above. However, a polarization state of the transmitted optical signal changes at random during the optical fiber transmission, and hence a part or all of the transmitted light may be converted to the orthogonal P polarization, which leads to a fear that the coherent field detector front end 100-1 cannot receive the field information on the S polarization component. To avoid this problem, when the coherent optical field receiver is used, polarization diversity reception is used, in which the S polarization and the P polarization of the received light are received by different receivers and recombined. Specifically, the other coherent field detector front end 100-2 is used to receive the P polarization component of the input optical signal 101 to obtain AD-converted output signals 112-3 and 112-4. The digital signal processing circuit 113 resolves the change of the polarization state by subjecting the output signals 112-1 to 112-4 (that is, the I components and the Q components of the polarizations) to equalization processing such as conversion of the polarization state and polarization mode dispersion, to thereby obtain the demodulated received field 116-1.

Subsequently, a symbol decision circuit 114, which uses Euclidean distances, compares the received signal constellation with the ideal signal constellation illustrated in FIG. 1B, for example, and decides which ideal signal point has been received, to thereby output a multilevel symbol string 115.

In coherent reception, it is generally known that a noise distribution of the received signal is isotropic on a signal plane. This is a state in which, as illustrated in FIG. 1B, a noise distribution is represented by a circle (hatched portion) centered on each signal point. In such case, decision based on the Euclidean distances is used for decision of the received signal, to thereby enable reception at the highest sensitivity.

FIG. 3A to FIG. 3C are each an explanatory diagram of a signal constellation of a conventional optical multilevel modulation method and a decision area for a received symbol based on Euclidean distances.

FIG. 3A is an explanatory diagram illustrating a signal constellation and a decision area for a received symbol based on Euclidean distances of the four-level phase modulation of the conventional technology.

When the received signal is the quaternary phase shift keying (QPSK), as illustrated in FIG. 3A, Euclidean distances $d(X,A)$, $d(X,B)$, $d(X,C)$, and $d(X,D)$ between the received field X and four ideal signal points A to D are calculated on the complex plane, and the ideal signal point (C in FIG. 3A) having the smallest Euclidean distance is decided as the received signal point. It should be noted that the Euclidean distance is a length of a line connecting two points in the figure. Meanwhile, the bold lines in the figure are boundary lines each at an equal distance from two adjacent signal points and serve as boundaries of the decision area for the signal point. For example, when the received field X falls in the area indicated by the vertical lines (phase angle: $3\pi/4$ to $-3\pi/4$), the received symbol is decided as C.

FIG. 3B is an explanatory diagram illustrating a signal constellation, a decision area, and boundary lines of the six-level phase modulation of the conventional technology.

FIG. 3C is an explanatory diagram illustrating a signal constellation, a decision area, and boundary lines of the sixteen-level phase modulation of the conventional technology.

As described above, the decision using the Euclidean distances has a feature that a decision area for each symbol is formed by lines each dividing an area between two signal points into exact halves.

It should be noted that, with respect to the coherent optical field receiver of the polarization diversity type of FIG. 2, an example in which two receivers are used to extract information on a transmission signal of one polarization has been described. However, employment of a polarization multiplexing format is also considered, in which mutually independent pieces of information are multiplexed with two orthogonal polarizations to be transmitted as transmission signals. In the polarization multiplexing, two transmitters for the X polarization and the Y polarization are provided on the transmit side so that both the X polarization and the Y polarization are subjected to the polarization multiplexing to be transmitted long-distance through the optical fiber transmission line, and both the X polarization and the Y polarization are received at the same time by the coherent optical field receiver of the polarization diversity type illustrated in FIG. 2. The digital signal processing circuit 113 performs orthogonal separation of the polarization components and equalization processing for the polarization mode dispersion, and extracts the demodulated received field 116-1 of the original X polarization component and a demodulated received field 116-2 of the original Y polarization component separately. The symbol decision circuit 114, which uses the Euclidean distances, performs symbol decision for each of the components, and demodulates two sets of multilevel symbol strings 115.

FIG. 4 is a block diagram illustrating a configuration of a phase pre-integration incoherent optical multilevel transmission system according to a conventional technology.

The phase pre-integration incoherent optical multilevel transmission system illustrated in FIG. 4 easily realizes transmission of the optical multilevel signal on the complex plane using optical delay detection with no local light source.

An unmodulated laser beam output from a laser source 210 is input to an optical field modulator 211 within a phase pre-integration optical field transmitter 200, and a transmission optical multilevel signal 213 subjected to required field modulation is output from an output optical fiber 212. A binary digital information signal 201 to be transmitted is converted into a complex multilevel information signal 203 within a multilevel encoder 202. The complex multilevel information signal 203 is a digital electric multilevel signal represented as (i, q) on a two-dimensional IQ plane, and a real part i and an imaginary part q of the signal are output at every time interval T (=symbol time). In an explanatory diagram illustrated in FIG. 4, a 16QAM signal illustrated in the balloon is used as an example of the complex multilevel information signal 203.

The complex multilevel information signal 203 is input to a phase pre-integration unit 204, in which only phase components of the input signal are digitally integrated at time intervals T and converted into a phase pre-integration complex multilevel information signal 205. Here, when $Ei(n)=(i(n),q(n))$ indicating the input complex multilevel information signal 203 is converted into polar coordinates on the complex plane, the signal can be represented as, for example, $Ei(n)=i(n)+jq(n)=r(n)\exp(j\phi(n))$ (j is an imaginary part unit). In this expression, n is a symbol number of the digital signal, r(n) is a symbol amplitude of the digital signal, and $\phi(n)$ is a phase angle. The phase pre-integrated signal to be output at this time can also be represented in polar coordinates as $Eo(n)=i'(n)+jq'(n)=r(n)\exp(j\theta(n))=r(n)\exp(j\Sigma\phi(n))$. In this expression, $\theta(n)$ is a phase angle of the output signal, and $\Sigma\phi(n)$ is a value obtained by accumulating past phase angles $\phi(1)$ to $\phi(n)$ at every time T. The output phase pre-integrated signal is again converted into a Cartesian coordinate system, and then output as the phase pre-integration complex multilevel information signal 205. Inside the balloon, the phase pre-integration complex multilevel information signal 205 is represented on the complex plane and has a concentric signal constellation that is significantly different from the complex multilevel information signal 203, which is the original 16QAM signal, after phase pre-integration operation.

The phase pre-integration complex multilevel information signal 205 is input to a sampling speed conversion circuit 206 and complemented so that the sampling speed becomes 2 samples/symbol or more. Thereafter, an inverse function of a degradation developed in an optical transmission line 214 or the like is applied to the phase pre-integration complex multilevel information signal 205 by a preequalization circuit 207, and then divided into a real part i" and an imaginary part q", which are converted into high-speed analog signals by DA converters 208-1 and 208-2, respectively. Those two high-speed analog signals are amplified by driver circuits 209-1 and 209-2, and then input to two modulation terminals I and Q of the optical field modulator 211. As a result, the transmission optical multilevel signal 213 can be generated with the preequalization phase integrated signals (i"(n), q"(n)) in the inphase component I and the quadrature component Q of the optical field. It should be noted that the optical field of the transmission optical multilevel signal 213 is (i"(n)+jq"(n))

$\exp(j\omega(n))$, and $\omega(n)$ is an optical angular frequency of the laser source 210. That is, the transmission optical multilevel signal 213 is (i"(n), q"(n)) when represented in the equalization low band where the optical frequency component is removed.

The transmission optical multilevel signal 213 is transmitted through the optical fiber transmission line 214, subjected to a transmission degradation by chromatic dispersion or the like of the optical fiber and amplification by the optical amplifier 117, and thereafter input to an incoherent optical field receiver 220 as a received optical multilevel signal 215. The transmission degradation is mutually canceled by the inverse function applied by the preequalization circuit 207 in advance, and therefore the optical field of the received signal is equal to the phase pre-integration complex multilevel information signal 205.

The received optical multilevel signal 215 is split into three optical signal paths by an optical splitter 222 in an incoherent field detector front end 221 to be input to a first optical delay detector 223-1, a second optical delay detector 223-2, and an optical intensity detector 225. The first optical delay detector 223-1 is set so that one of two optical paths has a delay time Td that is substantially equal to a symbol time T of the received optical multilevel information signal, and so that a difference of optical phase between those optical paths becomes 0. Further, the second optical delay detector 223-2 is set so that one of two optical paths has a delay time Td=T, and so that a difference of optical phase between those optical paths becomes $\pi/2$. Two output light beams of the first optical delay detector 223-1 and the second optical delay detector 223-2 are converted into electric signals by balanced optical detectors 224-1 and 224-2, respectively, and further into digital signals dI(n) and dQ(n) by A/D converters 226-1 and 226-2, respectively. Further, an output electric signal from the optical intensity detector 225 is also converted into a digital signal P(n) by an AD converter 226-3.

Thereafter, the digital signals dI(n) and dQ(n) are input to an inverse tangent circuit 227. The inverse tangent circuit 227 conducts inverse tangent operation of two arguments with dI(n) as an X component and dQ(n) as a Y component, and calculates a phase angle of the digital signals dI(n) and dQ(n). When the optical field of the received multilevel signal 215 is described as $r(n)\exp(j\theta(n))$, the digital signals dI(n) and dQ(n) can be represented as follows:

$dI(n) \propto r(n)r(n-1)\cos(\Delta\theta(n))$; and
$dQ(n) \propto r(n)r(n-1)\sin(\Delta\theta(n))$, based on the principle of the optical delay detection. In those expressions, $\Delta\theta(n)$ is a phase difference $(\theta(n)-\theta(n-1))$ from a symbol immediately before a received n-th optical field symbol. dI(n) and dQ(n) are a sine component and a cosine component of $\Delta\theta(n)$, respectively, and hence the inverse tangent circuit 227 conducts 4-quadrant inverse tangent (arc tan) operation so as to calculate $\Delta\theta(n)$.

It should be noted that, in this configuration, because the phase pre-integration is conducted at the transmit side as described above, a phase angle of the received optical field signal is $\theta(n)=\Sigma\phi(n)$. Hence, an output signal of the inverse tangent circuit 227 is $\Delta\theta(n)=\Sigma\phi(n)-\Sigma\phi(n-1)=\phi(n)$, and a phase component $\phi(t)$ of the original complex multilevel information signal 203 can be extracted.

On the other hand, the output signal P(n) of the optical intensity detector 225 is input to a square root circuit 228 so as to obtain an original field amplitude $r(n)=\text{sqrt}(P(n))$ as an output. Therefore, when the obtained amplitude component r(n) and phase component $\phi(n)$ are input to a Cartesian coordinate converter circuit 229, a Cartesian coordinate representation (i, q)=$r(n)\exp(j\phi(n))$ is obtained as the demodulated received field 116. This is the same signal constellation as that of the original complex multilevel information signal 203. Therefore, when the obtained signal is input to the symbol decision circuit 114, which uses the Euclidean distances, to perform the symbol decision, the multilevel symbol string 115 can be generated again.

It should be noted that, in the phase pre-integration transmission format, the signal constellation of the optical field transmitted by the transmitter (which is the same as the signal constellation of the phase pre-integration complex multilevel information signal 205) and the signal constellation of the demodulated received field 116 in the receiver are different as described above. Hereinafter, this invention mainly focuses on a decision format of the received field. Therefore, the terms "the signal constellation" and "decision" as used herein regarding the phase pre-integration format refer to the signal constellation of the demodulated received field 116 (or the complex multilevel information signal 203).

Non Patent Literature 1: R. A. Griffin, et al., "10 Gb/s Optical Differential Quadrature Phase Shift Key (DQPSK) Transmission using GaAs/AlGaAs Integration", OFC2002, paper PD-FD6, 2002

Non Patent Literature 2: N. Kikuchi, K. Mandai, K. Sekine and S. Sasaki, "First experimental demonstration of single-polarization 50-Gbit/s 32-level (QASK and 8-DPSK) incoherent optical multilevel transmission", in Proc. Optical Fiber Communication Conf. (OFC/NFOEC), Anaheim, Calif., March 2007, PDP21

Non Patent Literature 3: J. Hongou, K. Kasai, M. Yoshida and M. Nakazawa, "1 Gsymbol/s, 64 QAM Coherent Optical Transmission over 150 km with a Spectral Efficiency of 3 Bit/s/Hz", in Proc. Optical Fiber Communication Conf. (OFC/NFOFEC), Anaheim, Calif., March 2007, paper OMP3

Non Patent Literature 4: M. G. Taylor, "Coherent detection method using DSP to demodulate signal and for subsequent equalization of propagation impairments", paper We4. P. 111, ECOC 2003, 2003

SUMMARY OF THE INVENTION

A first problem to be solved by this invention is a degradation in bit error rate and a degradation in receiver sensitivity in the above-mentioned optical multilevel transmission format. Conventionally, decision of the received optical multilevel signal is generally performed by decision based on the Euclidean distances, which, however, is a symbol decision method optimal when a noise distribution of the received optical field is isotropic. This invention, on the other hand, focuses attention on a case where anisotropic noise is generated, in which noise of the received multilevel signal in an angular direction is larger than noise thereof in a radial direction. In the case where the anisotropic noise is generated, when the conventional isotropic signal constellation and isotropic decision method are used, a symbol decision error with respect to the signal point that is adjacent in the angular direction increases, with the result that the receiver sensitivity is significantly degraded. This invention has an object of preventing such degradation in receiver sensitivity, to thereby enable multilevel transmission at high sensitivity.

Next, a second problem to be solved by this invention is a degradation in efficiency of the optical multilevel transmission in the case where the anisotropic noise is generated as described above. In the conventional optical multilevel transmission, it has been held that the four-level phase modulation method, combined with the coherent receiver that performs isotropic symbol decision, could give the optimal receiver sensitivity. However, in the presence of the anisotropic noise addressed by this invention, in which an excessive amount of noise exists in the angular direction, the optimal multilevel modulation method and decision format are different from conventional ones. Therefore, this invention has an object of providing a multilevel transmission format that is optimal for such case.

The above-mentioned first problem can be solved by modulating both the amplitude and the phase of an optical signal, and also by setting, in the symbol decision in an optical multilevel receiver, for positions of all or some of the ideal signal points, the width in the angular direction of the decision area, to which each of the ideal signal points belongs and which is measured along a circumference of a circle centered at an origin and passing through a center of the each of the ideal signal points, larger than the width in the angular direction of the decision area defined based on the Euclidean distance.

Further, the second problem can be solved by using, as multilevel modulation codes, 6QAM modulation in which a difference in intensity is provided between adjacent ideal signal points in the six-level phase modulation with the phase interval of 60 degrees, and 4QAM modulation in which a difference in intensity is provided between adjacent ideal signal points in the four-level phase modulation with the phase interval of 90 degrees. When those modulated signals are received, the symbol decision in which the decision area is enlarged in the angular direction is performed as described above, to thereby enable further improvement in resistance to phase noise and the receiver sensitivity.

The enlargement of the symbol decision area as described above can be realized by performing symbol decision using, for example, non-Euclidean distances weighted so that the distances in the radial direction are larger than the distances in the angular direction.

Further, this invention is applied to a transmission system with excessive phase noise. Therefore, a phase noise removing circuit of the MSPE method or the like for reducing phase noise may be provided in the receiver to reduce the amount of phase noise.

Further, when this invention is applied, phase noise needs to be larger than intensity noise as described above. One representative example is a multilevel transmission system in which the optical multilevel signal is wavelength multiplexed with another optical signal having an intensity modulation component. In such transmission system, intensity modulated light causes a cross-phase modulation effect (XPM) in the optical fiber, with the result that phase noise of the optical multilevel signals travelling in parallel increases to cause a significant degradation, which renders application of this invention very effective.

Further, in order to implement this invention, there is needed means for detecting the amplitude component and the phase (or phase difference) component of the optical field, that is, optical field information. An example of such optical field receiver is a receiver including a local light source, for performing coherent detection of the inphase component and the quadrature component of the optical field of the optical multilevel signal.

Also in the coherent receiver, in a case where strong self-phase modulation and cross-phase modulation occur in the optical signal transmission as described above, in a case where electrical delay detection is performed in the receiver, or in a case where phase noise of the light source is large, phase noise is larger than intensity noise, which renders application of this invention effective.

This invention is also applicable to an optical field receiver which uses direct reception, that is, a receiver including a light intensity receiver and two or more optical delay detection receivers with delay time T, for directly detecting the phase difference between the times T and a light intensity of the optical multilevel signal.

It should be noted that, in an optical multilevel transmitter which uses direct reception, phase pre-integration signal processing of accumulating phase components of the optical signal every time T in advance may be performed to cancel the effect of the optical delay detection on the received signal constellation, which facilitates detection of the multilevel signals.

In this invention, when a most-likelihood sequence estimation (MLSE) algorithm is used, the non-Euclidean distances which are obtained by weighting the Euclidean distances used in the normal MLSE decision so that the distances are larger in the radial direction than in the angular direction of this invention.

Further, in this invention, the polarization multiplexing may be realized by polarization multiplexing two sets of optical multilevel signals, which are output from two optical multilevel transmitters and modulated with different information signals, into two orthogonal polarization states, and on the receive side, subjecting the multiplexed signals to the polarization diversity reception or polarization beam splitting and receiving the same by the two above-mentioned multilevel receivers, to thereby further improve the efficiency of the optical multilevel transmission in this invention.

This invention employs multilevel symbols using both the amplitude and the phase. As a result, the amount of information to be transmitted is reduced by the modulation in the angular direction as compared to the conventional methods, which provides an effect of improving resistance to noise in the angular direction. Then, the decision area for the multilevel signal is enlarged further in the angular direction, which provides an effect of further improving the resistance to noise in the angular direction.

In particular, the 6QAM modulation in which a difference in intensity is provided between adjacent ideal signal points of the six-level phase modulation with the phase interval of 60 degrees, or the 4QAM modulation in which a difference in intensity is provided between adjacent ideal signal points in the four-level phase modulation with the phase interval of 90 degrees is a modulation method with which the receiver sensitivity is optimal in a multilevel transmission format in the presence of anisotropic noise in which noise in the angular direction is large, which realizes most efficient multilevel transmission. It should be noted that, in order to sufficiently obtain the effect, it is desired that the decision area for the multilevel signal be enlarged in the angular direction on the receive side as described above.

When a method of enlarging the decision area is to use the above-mentioned non-Euclidean distance to define a distance between two points by weighting the distance so as to be larger in the radial direction than in the angular direction, symbol decision boundaries, that is, partitions each at an equal distance from two symbols are reduced in the radial direction and enlarged in the angular direction in a relative manner. Therefore, the method using the non-Euclidean distance has an effect of enlarging the decision area in the angular direction. Further, when the non-Euclidean distance is used, there is an effect of facilitating implementation of the decision algorithm for performing the symbol decision by calculating the distance between symbols.

When the above-mentioned method of enlarging the decision area is used, there is obtained an effect that the degradation in receiver sensitivity due to the increase in phase noise is suppressed, but some degradation still occurs when compared to the ideal receiver sensitivity that is obtained when the noise is totally isotropic. Therefore, when the amount of phase noise can be decreased also in this invention, it is possible to obtain a receiver sensitivity that is closer to the theoretical receiver sensitivity. Therefore, a phase noise removing circuit of the MSPE method or the like is used in combination, to thereby obtain the effects of further reducing the degradation and increasing the receiver sensitivity.

This invention provides significant improvement in the receiver sensitivity especially when applied to the optical field receiver which uses direct reception. The optical field receiver in this invention has a configuration in which the optical delay detection is used to detect the phase difference between symbols, and hence phase noise is always larger than amplitude noise in the received signal, which results in an essential degradation in receiver sensitivity. It should be noted that this invention is the first to point out this phenomenon.

Further, when the polarization multiplexing is employed in this invention, there is obtained an effect that the efficiency of optical multilevel transmission is further improved twice.

BRIEF DESCRIPTION OF THE DRAWINGS

FIG. 13A is a block diagram illustrating a configuration of the symbol decision circuit which uses the amplitude-weighted non-Euclidean distance according to the fourth embodiment of this invention.

FIG. 13B is an explanatory diagram illustrating an internal configuration of the decision table according to the fourth embodiment of this invention.

FIG. 14A is a block diagram illustrating a configuration of the multilevel encoder according to the fourth embodiment of this invention.

FIG. 14B is an explanatory diagram illustrating the 6QAM modulation mapping table according to the fourth embodiment of this invention.

DETAILED DESCRIPTION OF THE PREFERRED EMBODIMENTS

Figure 5:
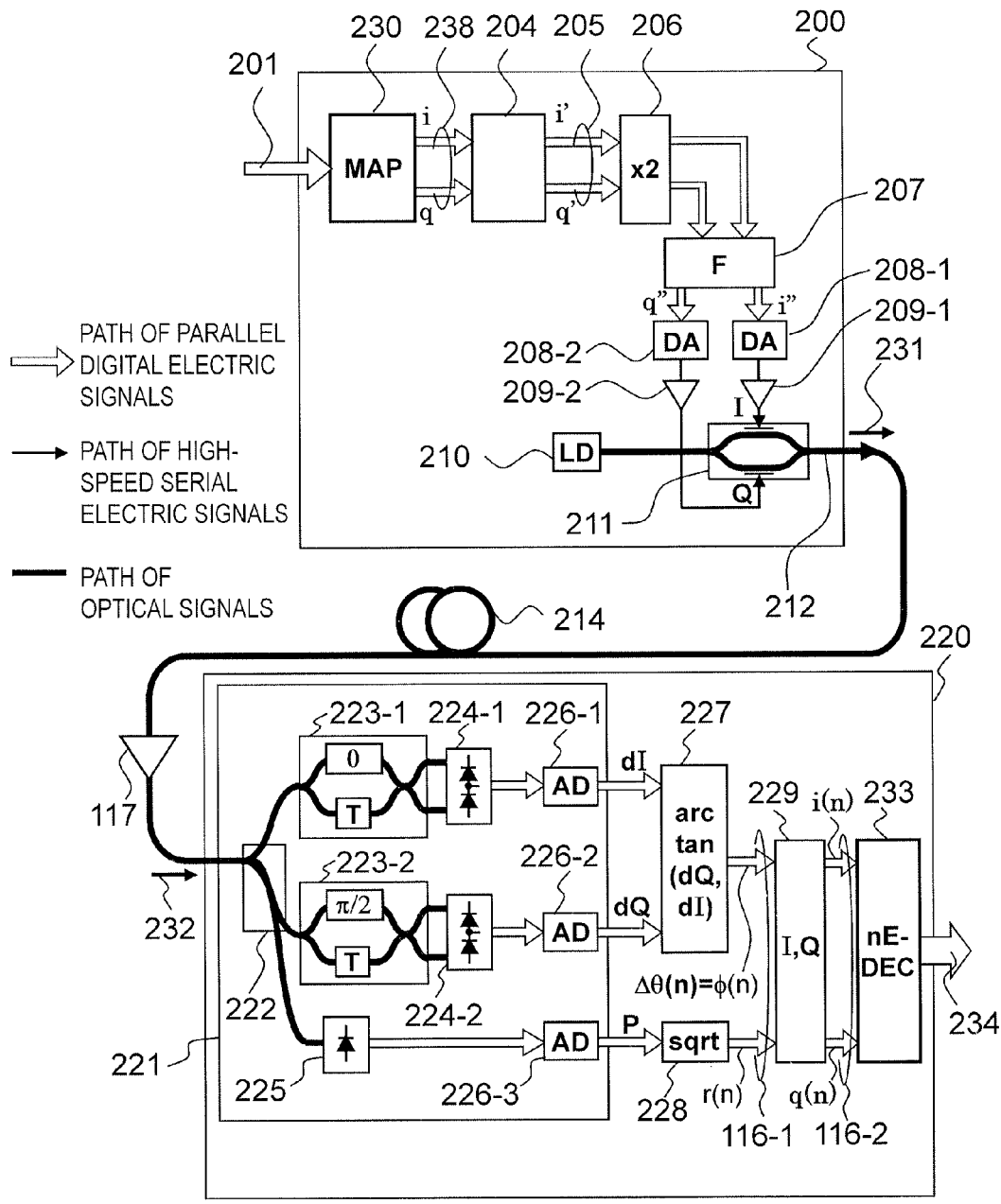
FIG. 5 is a block diagram illustrating a phase pre-integration incoherent optical multilevel transmission system according to a first embodiment of this invention.

FIG. 5 is a block diagram illustrating a phase pre-integration incoherent optical multilevel transmission system according to a first embodiment of this invention.

Hereinafter, a path of optical signals is indicated by a bold line, a path of electric signals is indicated by a thin line, and a path of parallel digital electric signals using a plurality of signal wires is indicated by white open arrows. This configuration is an incoherent optical multilevel transmission system using a phase pre-integration optical field transmitter 200 and an incoherent optical field receiver 220.

Figure 4:
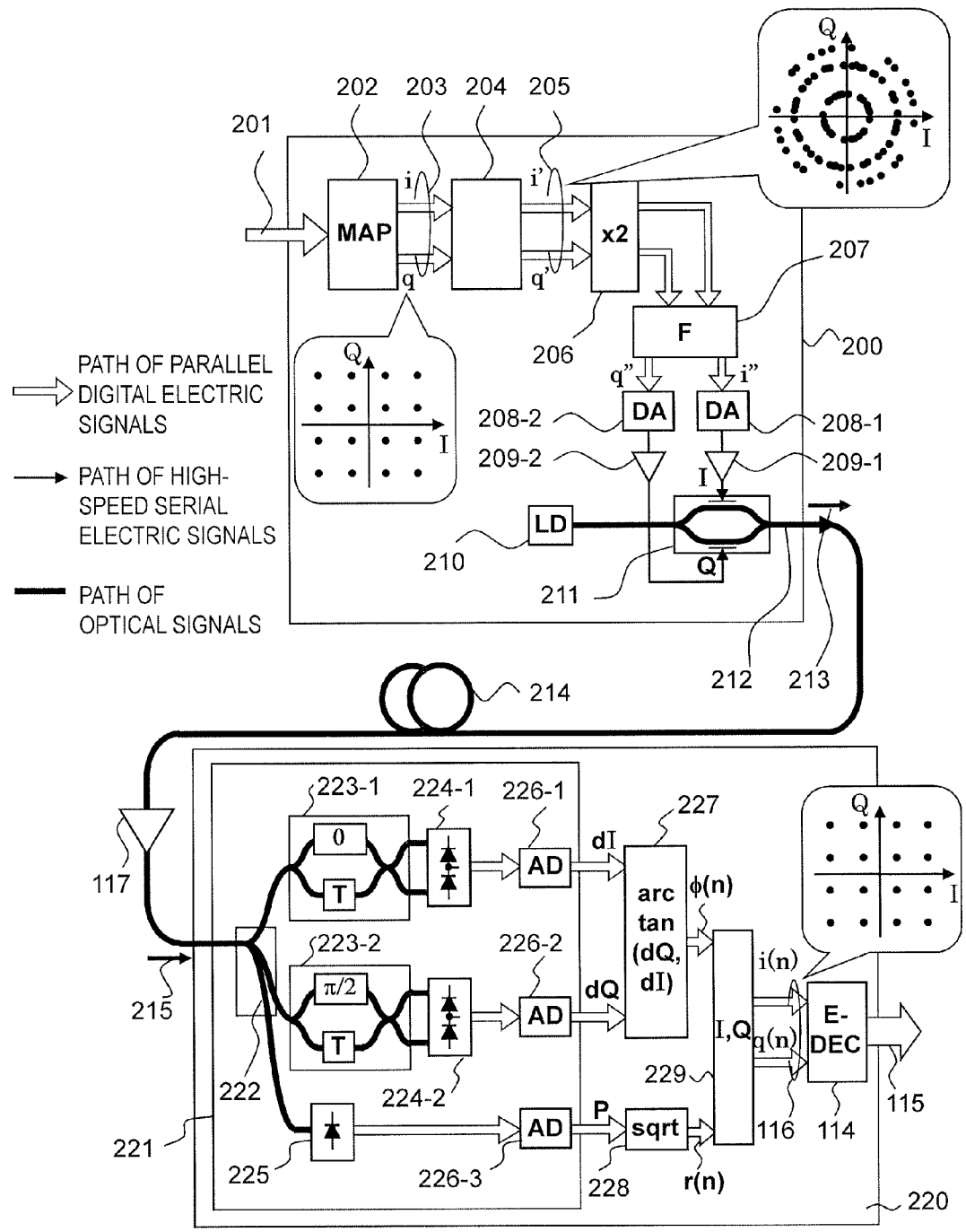
FIG. 4 is a block diagram illustrating a configuration of a phase pre-integration incoherent optical multilevel transmission system according to a conventional technology.

A first difference between the conventional technology illustrated in FIG. 4 and this embodiment resides in a symbol decision circuit inside the incoherent optical field receiver 220, and in this embodiment, a symbol decision circuit 233 which uses an amplitude-weighted non-Euclidean distance is used.

A second difference between the conventional technology illustrated in FIG. 4 and this embodiment resides in the signal constellation. A multilevel encoder 230 of this invention has a function of allocating 6QAM modulation as a two-dimensional complex multilevel signal to the input binary digital information signal 201.

FIGS. 6A to 6E are each an explanatory diagram illustrating a signal constellation of a 6QAM signal and a decision area for a received symbol based on a non-Euclidean distance.

Figure 6A:
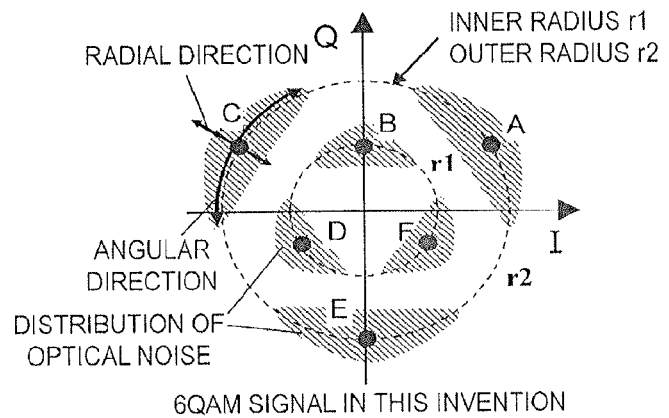
FIG. 6A is an explanatory diagram illustrating a signal constellation of the 6QAM according to the first embodiment of this invention.

FIG. 6A is an explanatory diagram illustrating the 6QAM signal according to the first embodiment of this invention.

The 6QAM signal is an optical multilevel signal modulated both in phase and in amplitude, in which six signal points A to F are subjected to phase modulation on the complex plane at intervals of 60 degrees, and at the same time, to optical intensity (or amplitude) modulation so that odd-numbered signal points (A, C, and E) are positioned on an outer circumference of a radius r2 and even-numbered signal points (B, D, and F) are positioned on an inner circumference of a radius r1.

A third difference between the conventional technology illustrated in FIG. 4 and this embodiment resides in a noise distribution of the received field signal. Noise of the received field signal of this invention around the signal points A to F illustrated in FIG. 6A is indicated by hatching. This invention addresses a case where the noise distribution is anisotropic as illustrated in FIG. 6A, in particular, a case where the signal has larger noise in an angular direction than in a radial direction.

This invention teaches an optical modulation method, an internal configuration of optical transmitter and receiver, and a configuration of an optical multilevel transmission system, which can exhibit high performance and high sensitivity especially in the case where the received signal has larger noise in the angular direction as described above.

One such configuration in which larger noise occurs in the angular direction is a configuration, which uses the incoherent receiver 220 illustrated in FIG. 5 to detect and compose the amplitude and a phase difference of the optical signal.

To a received optical multilevel signal 232 (expressed in polar coordinates as r(n)exp(jθ(n)) input to the incoherent optical field receiver 220, optical noise is added from a plurality of optical amplifiers (in FIG. 5, only one is shown) provided in the optical fiber transmission line 214 to significantly degrade an optical signal to noise ratio (OSNR) of the signal. The optical noise is isotropic noise generated when spontaneous emission originating from the optical amplifiers is amplified (amplified spontaneous emission (ASE) light), and has the same amount of noise components in the radial direction and the angular direction. Therefore, when the received optical multilevel signal 232 is coherently received, the received optical field has isotropic noise. In contrast, the incoherent optical field receiver 220 illustrated in FIG. 5 uses the first optical delay detector 223-1 and the second optical delay detector 223-2 to obtain the product of two optical fields (at phase angles θ(n) and θ(n−1)) separated by time T and detect a phase difference Δθ(n) of the two optical fields. The two optical fields are degraded by optical noise independently of each other, and hence Δθ(n) includes phase noise that is twice larger than that of θ(n). Further, when an amount of amplitude noise of r(n) is represented by ε(n), the result of detection by the coherent detection is r(n)+ε(n). In the incoherent detection, on the other hand, intensity components P(n)=(r(n)+ε(n))^2 are detected. Those intensity components are simple squares of the same field components, and hence return to r(n)+ε(n) by calculating square roots. In other words, when the amplitude component and the phase difference component of the optical field are to be incoherently detected and combined, the amount of noise of the phase component is increased to about twice that in the coherent detection. The above-mentioned phenomenon has not heretofore been pointed out.

It should be noted that, in this configuration, phase pre-integration processing is performed on the transmit side to cancel the effect of the optical delay detection, which is merely a cancellation of the change in signal constellation, and the effect of the optical noise generated in the transmission cannot be canceled. Therefore, regardless of whether or not the phase pre-integration is performed, the incoherent field reception as described above has a nature that the amount of phase noise is larger than the amount of amplitude noise.

Figure 3A:
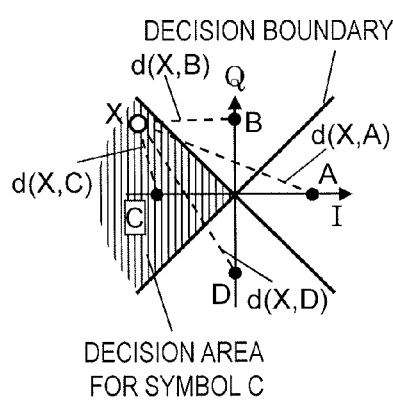
FIG. 3A is an explanatory diagram illustrating a signal constellation and a decision area for a received symbol based on Euclidean distances of the four-level phase modulation of the conventional technology.
Figure 3B:
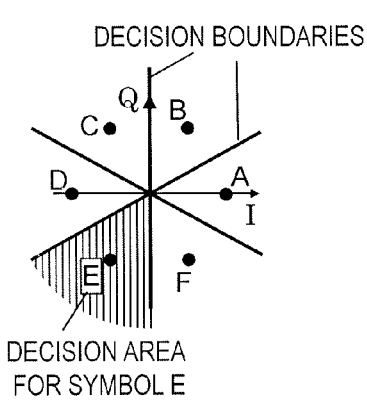
FIG. 3B is an explanatory diagram illustrating a signal constellation, a decision area, and boundary lines of the six-level phase modulation of the conventional technology.

This invention employs the signal obtained by modulating both the amplitude and the phase as in the 6QAM modulation as a method of receiving such signal at high sensitivity. In a case where an optical signal in which only the phase is modulated as in the QPSK modulation taught in the conventional technologies, there is no choice but to make the distinction between the signal points only by the phase (or phase difference), and the decision area for a signal point is limited to a range of 90 degrees as illustrated in FIG. 3A, which leaves no room for handling an increase in phase noise. In contrast, with the 6QAM modulation of FIG. 6A, the number of signal points having the same amplitude r1 or r2 is limited to three, and hence the phase interval between the signal points is increased up to 120 degrees, to thereby provide room for handling the increase in noise.

Figure 7A:
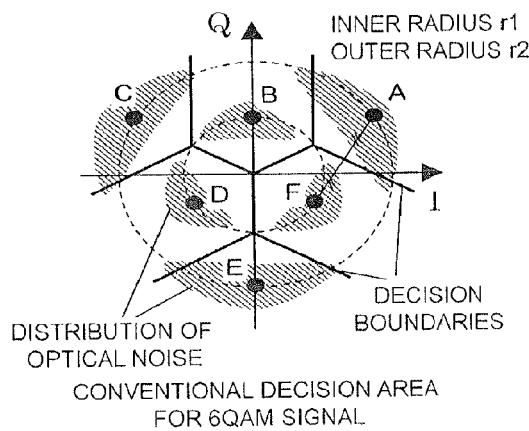
FIG. 7A is an explanatory diagram illustrating a decision area for a received signal point based on the Euclidean distance for the 6QAM signal according to the conventional technology.

FIG. 7A is an explanatory diagram illustrating a conventional decision area for a received signal point based on the Euclidean distance for the 6QAM signal according to the conventional technology.

Line segments each dividing the Euclidean distance from the ideal signal points into exact halves are boundary lines for the decision area. In FIG. 7A, the decision area for a signal point having a radius r1 extends over a phase width of exactly 120 degrees. As a result, in this invention, even if the amount of noise increases in the angular direction due to phase noise, accurate symbol decision can be performed.

Then, when the attention is focused on the signal points on the outer circumference of the radius r2 in FIG. 7A, the angular direction width of the decision area is decreased to 30 degrees. As a result, when there is an anisotropic noise distribution as indicated by hatching on each symbol, a signal point on the outer circumference may lie off the decision area. As a result, a possibility that the signal point is erroneously decided as a signal point on the inner circumference may increase, and the transmission properties such as the receiver sensitivity may be significantly degraded.

To address the above-mentioned problem, in this invention, the width of the decision area is increased in the angular direction, to thereby improve the bit error rate.

Figure 6B:
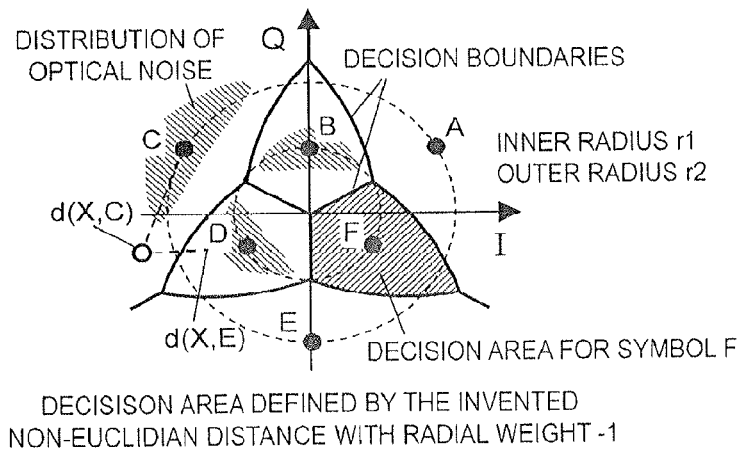
FIG. 6B is an explanatory diagram illustrating a decision area for a received symbol based on the non-Euclidean distance according to the first embodiment of this invention.

FIG. 6B is an explanatory diagram illustrating a decision area for a received symbol based on the non-Euclidean distance according to the first embodiment of this invention.

The decision area in FIG. 6B defines the distance between two points by the non-Euclidean distance d(X,Y)=(Euclidean distance)+a*(|X|−|Y|)^2, where weight a>0 and uses the distance for the symbol decision. The boundary lines of the decision area are lines each at an equal non-Euclidean distance from ideal signal points, and are curved lines illustrated in FIG. 6B in this example. A region defined by the curved lines is the decision area for each symbol (in FIG. 6B, the area decided as a symbol F is indicated by hatching). It can be seen, for example, on the dotted line of the outer circumference, the decision areas for three ideal signal points A, C, and E are each significantly enlarged to near 120 degrees. This way, noise distributions of the signal points B, D, and C, which are indicated by hatching in FIG. 6B, all fall in the decision areas, and hence the bit error rate is significantly improved.

Figure 6C:
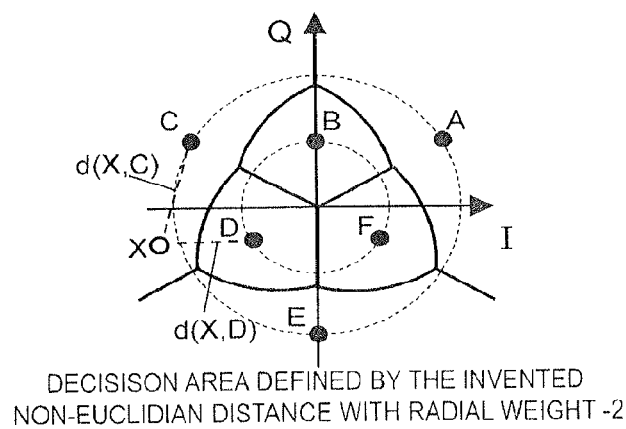
FIG. 6C is an explanatory diagram illustrating a decision area of a received symbol based on the non-Euclidean distance according to the first embodiment of this invention.

FIG. 6C is an explanatory diagram illustrating a decision area of a received symbol based on the non-Euclidean distance according to the first embodiment of this invention.

FIG. 6C illustrates the decision area obtained by increasing the value of the weight a and further increasing the weight in the radial direction. As compared to the decision area illustrated in FIG. 6B, the width of the decision area illustrated in FIG. 6C is further increased in the angular direction. In this manner, by defining the non-Euclidean distance appropriately or setting the shape of the decision area depending on the actual noise distribution, the effect of improving the error rate may be increased.

It should be noted that it is not always necessary to increase the width in the angular direction for all the decision areas.

For example, the decision area illustrated in FIG. 6B, which is an embodiment of this invention, and the decision area illustrated in FIG. 7A, which is an example using the conventional Euclidean distance, are compared. Of the decision areas illustrated in FIG. 6B, the width in the angular direction is increased for the decision areas for the symbols A, C, and E on the dotted line of the outer circumference. On the other hand, on the same dotted line on the outer circumference, the width in the angular direction is significantly reduced for the decision areas for the symbols B, D, and E.

This is because, of the decision areas illustrated in FIG. 6B, in an area far apart from the position of the ideal signal point of each symbol in the radial direction, the possibility that the signal appears due to the noise is significantly reduced, and hence the effect on the bit error rate is ignorable even when the area is narrowed. Further, when the width of the decision area is already the maximum (in this example, 360/3=120 degrees) in the angular direction as in the case of the signal points on the inner circumference illustrated in FIG. 7A, the decision area cannot be enlarged any more. Therefore, in this invention, only for an ideal signal point for which the width of the decision area in the angular direction is small, the width of the area to which the symbol belongs is enlarged in the angular direction at least on the same radius with the ideal signal points, which is a feature of this invention.

It should be noted that the shape of the optimal decision area can be obtained by setting, for example, the boundary lines that provide the minimum error rate with respect to the noise distribution. The boundary lines may be calculated theoretically, or may be set by adaptive study using a known symbol string or by blind learning.

An easier method may be to set the boundary lines artificially by an approximation, a fitted curve, or linear partition. For example, the decision area illustrated in FIG. 6D is an example in which the boundary lines are approximated linearly.

Figure 6D:
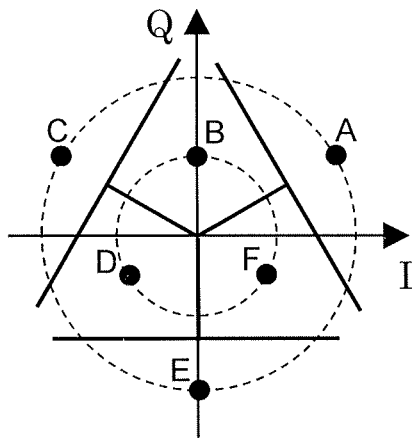
FIG. 6D is an explanatory diagram illustrating the decision areas approximated by the linear partition according to the first embodiment of this invention.

FIG. 6D is an explanatory diagram illustrating the decision areas approximated by the linear partition according to the first embodiment of this invention.

The boundary lines approximated by the linear partition are not theoretically optimal solutions but can provide the effect of significantly improving the error rate with simple settings.

Figure 6E:
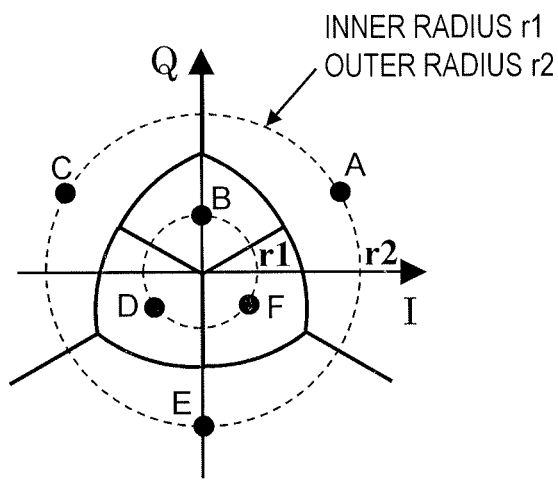
FIG. 6E is an explanatory diagram illustrating a signal constellation and a decision area corresponding to a larger amplitude difference according to the first embodiment of this invention.

Further, the 6QAM signal illustrated in FIG. 6A shows an example in which six signal points are arranged on an equilateral triangle with the signal points being spaced apart with the same interval. This is essentially an arrangement in which the highest receiver sensitivity is obtained when the noise distribution is isotropic. When the noise in the angular direction is large as in this embodiment, as illustrated in FIG. 6E, correction is made further so that the amplitude difference between the inner peripheral and the outer peripheral becomes large, which leads to larger distance (in the above-mentioned example, the amplitude-weighted non-Euclidean distance) between signals, and hence an effect of improving the receiver sensitivity is obtained. Such signal constellation is especially effective when combined with the correction of the decision areas as described above.

FIG. 6E is an explanatory diagram illustrating a signal constellation and a decision area corresponding to a larger amplitude difference according to the first embodiment of this invention.

Figure 7B:
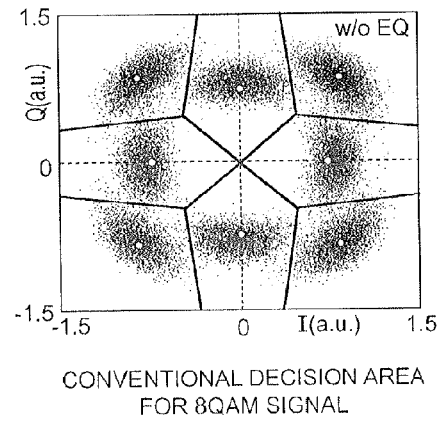
FIG. 7B is an explanatory diagram illustrating a decision area for an 8QAM signal according to a conventional technology
Figure 7C:
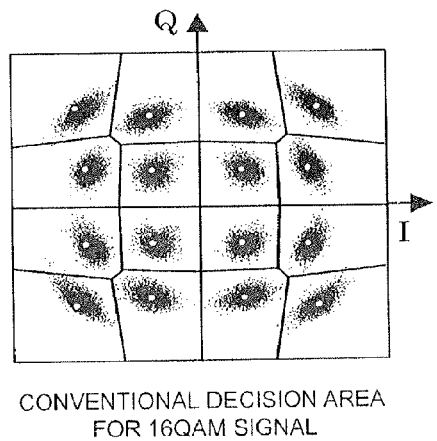
FIG. 7C is an explanatory diagram illustrating a decision area for a 16QAM signal according to a conventional technology.

FIG. 7B is an explanatory diagram illustrating a decision area for an 8QAM signal according to a conventional technology, and FIG. 7C is an explanatory diagram illustrating a decision area for a 16QAM signal according to a conventional technology.

Figure 3C:
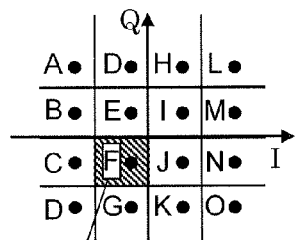
FIG. 3C is an explanatory diagram illustrating a signal constellation, a decision area, and boundary lines of the sixteen-level phase modulation of the conventional technology.

The white circles in FIGS. 7B and 7C indicate positions of the ideal signal points of the multilevel signals, and the bold lines in FIGS. 7B and 7C indicate the boundary lines of the conventional decision areas defined by Euclidean distances. It should be noted that, with the 16QAM modulation illustrated in FIG. 7C, the interval of the symbols in the radial direction is slightly increased compared to the 16QAM modulation illustrated in FIG. 3C, and hence the boundary lines are inclined straight lines. Further, the black dots around the ideal signal points are distributions of the signal points obtained in an actual experiment. The experiment used the phase pre-integration incoherent optical multilevel transmission system illustrated in FIG. 5, and hence it can be seen that the distributions of the signal points (to be exact, signal and noise) are anisotropic shapes extending in the angular direction. In FIG. 7B, the distributions of the signal points extend to adjacent decision areas for symbols, making the system prone to a symbol decision error. Further, also in FIG. 7C, the shapes of the distributions of the signal points obtained in the experiment and the shapes of the decision areas are considerably different, making the system prone to a decision error especially with respect to the breadth in the angular direction of the signal points on the outermost circumference.

Figure 8:
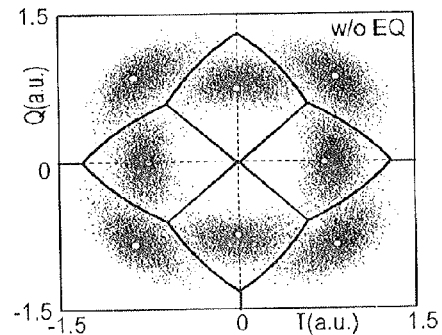
FIG. 8 is an explanatory diagram illustrating a signal constellation and a decision area for a received symbol based on the non-Euclidean distance of 8QAM modulation according to a second embodiment of this invention.

FIG. 8 is an explanatory diagram illustrating a signal constellation of 8QAM modulation according to a second embodiment of this invention, and a decision area for a received symbol based on the non-Euclidean distance.

This invention takes an example in which an 8QAM signal is used as the modulation signal and in which the non-Euclidean distance $d(X,Y)$ is used to define the decision area. In this example, in $dE(x,y)=|x-y|^2+a(|x|-|y|)^2$, the amplitude weight a is set to 2. As a result, the decision areas for all the symbols are enlarged to near 90 degrees in the angular direction on the dotted circumference on which each symbol is located, and hence the resistance to the noise in the angular direction is significantly improved compared to the decision areas described above with reference to FIG. 7B. Further, the boundary lines generally coincide with sparse regions of the eight distributions of black dots, which also demonstrates that near-ideal decision can be made.

Figure 9A:
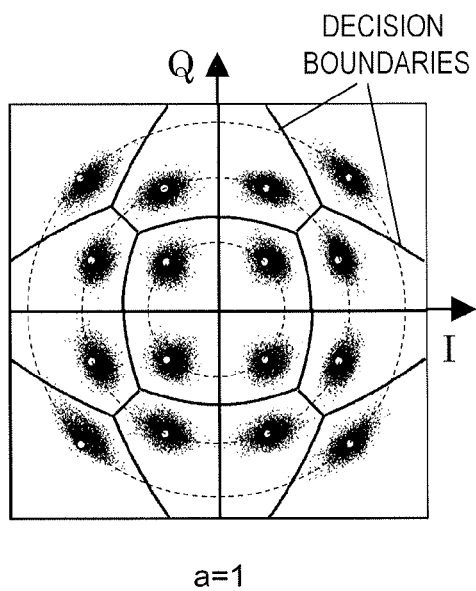
FIG. 9A is explanatory diagram illustrating a signal constellation and decision areas for the received symbol based on the non-Euclidean distance when the weight a is set to 1 of 16QAM modulation according to a third embodiment of this invention.
Figure 9B:
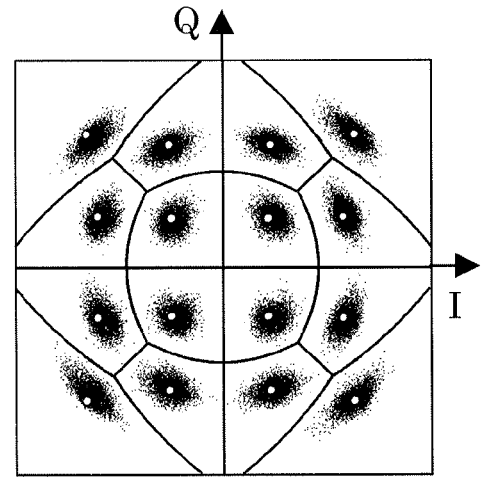
FIG. 9B is explanatory diagram illustrating a signal constellation and decision areas for the received symbol based on the non-Euclidean distance when the weight a is set to 2 of 16QAM modulation according to a third embodiment of this invention.
Figure 9C:
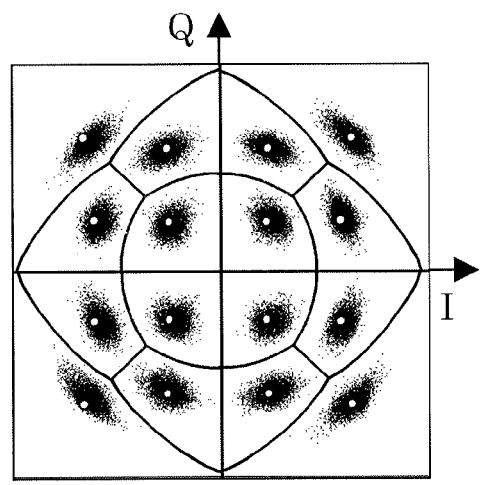
FIG. 9C is explanatory diagram illustrating a signal constellation and decision areas for the received symbol based on the non-Euclidean distance when the weight a is set to 3 of 16QAM modulation according to a third embodiment of this invention.

FIGS. 9A to 9C are explanatory diagrams each illustrating a signal constellation and decision areas for the received symbol based on the non-Euclidean distance of 16QAM modulation according to a third embodiment of this invention.

FIGS. 9A to 9C are explanatory diagrams illustrating the signal constellation and a decision area for a received symbol based on a non-Euclidean distance when the weight a is set to 1 to 3 of the 16QAM modulation according to the third embodiment of this invention.

This invention takes an example in which the 16QAM signal is used as the modulation signal and in which the non-Euclidean distance $d(X,Y)$ is used to define the decision area. The definition of $d(X,Y)$ in this example is the same as the second embodiment, but the amplitude weight a is changed to examine the change in the decision area. FIGS. 9A to 9C illustrate cases where a=1, a=2, and a=3, respectively, and it can be seen from the figures that as the amplitude weight a is set larger, the width of the decision area in the angular direction becomes gradually larger and the shape becomes closer to a shape obtained by radially partitioning concentric circles. Therefore, according to this invention, the optimal shape of the decision area suitable for the actual distribution of signal points (noise) may be selected by adjusting a parameter defining the non-Euclidean distance or other such operation. It should be noted that such change in shape of the decision area is not necessarily limited to parameter adjustment, and may be attained by switching among several types of decision tables or by automatic adaptive adjustment.

Figure 10:
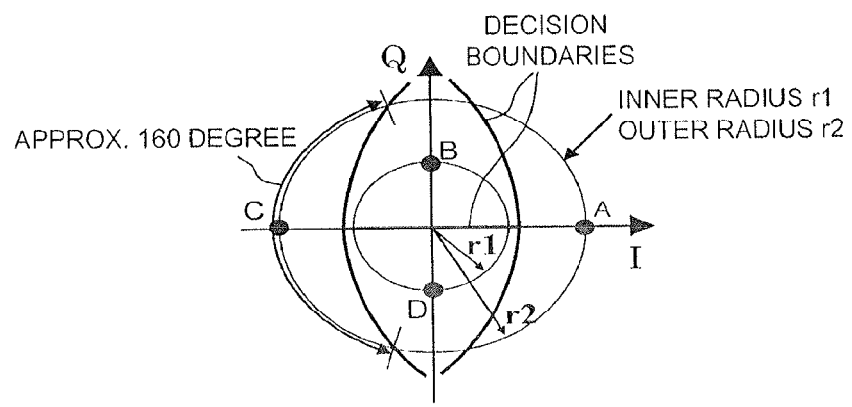
FIG. 10 is an explanatory diagram illustrating a signal constellation and a decision area of 4QAM modulation according to a fourth embodiment of this invention.

FIG. 10 is an explanatory diagram illustrating a signal constellation and a decision area of 4QAM modulation according to a fourth embodiment of this invention.

Figure 1A:
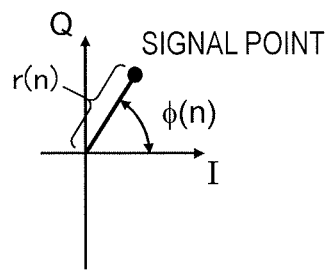
FIG. 1A is an explanatory diagram illustrating a signal point on the IQ plane according to a conventional technology.
Figure 1B:
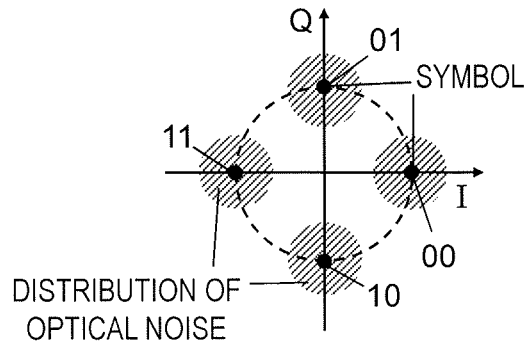
FIG. 1B is an explanatory diagram illustrating a signal constellation of quaternary phase shift keying (QPSK) according to a conventional technology.
Figure 1C:
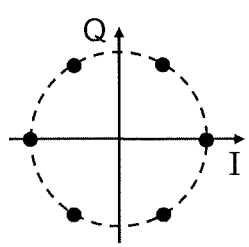
FIG. 1C is an explanatory diagram illustrating six-level phase modulation in which the phase angles $\phi(n)$ are increased to six levels $(0, \pi/3, 2\pi/3, -\pi, -2\pi/3, -\pi/3)$ having spacing of $\pi/3$ according to a conventional technology.
Figure 1D:
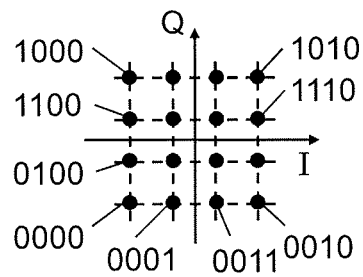
FIG. 1D is an explanatory diagram illustrating sixteen-level quaternary amplitude modulation (16QAM) widely used in radio communications according to a conventional technology.
Figure 2:
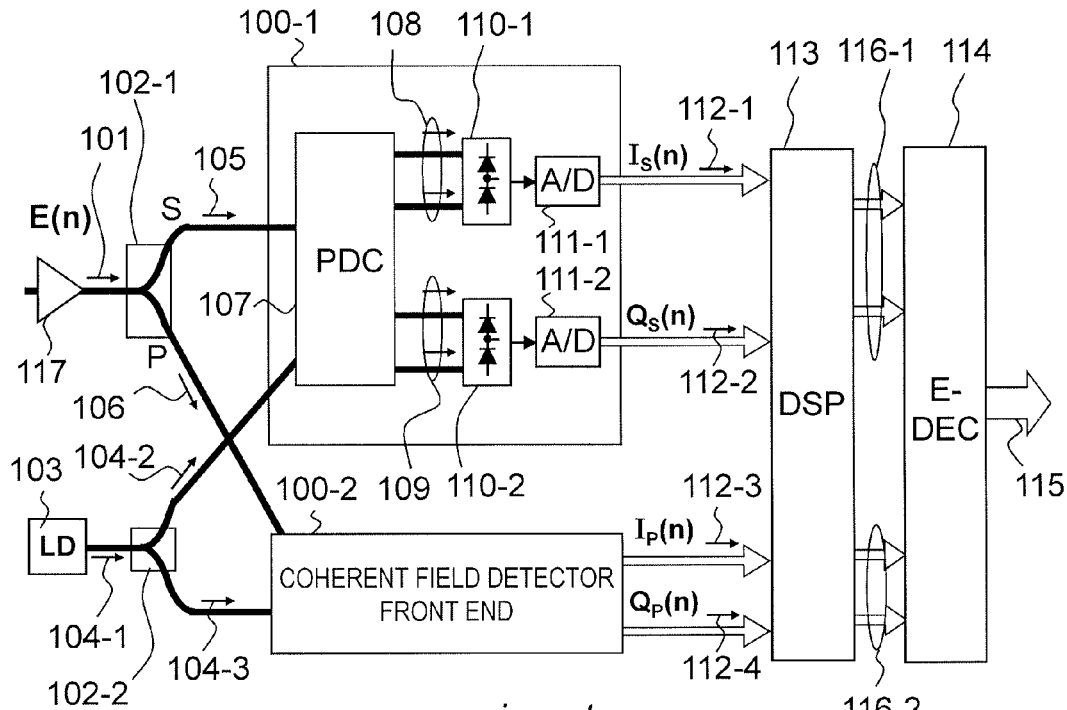
FIG. 2 is a block diagram illustrating a coherent optical field receiver of a polarization diversity type, which simultaneously receives information on two polarizations of the optical signal according to a conventional technology.

In the signal constellation of the 4QAM modulation, not only the phase is modulated every 90 degrees as in the conventional four-level phase modulation illustrated in FIG. 1A, but at the same time, two values r1 and r2 are provided for the amplitude so that the amplitudes of the signal points A and C are modulated to r2 and the amplitudes for the signal points B and C are modulated to r1. In the case where the noise distribution is isotropic as in the coherent reception and in the case where only phase difference information of the received signal is used to detect the optical signal as in the conventional DQPSK receiver, such constellation ends up deteriorating the receiver sensitivity. However, in the case where the noise of the optical signal becomes large in the angular direction as in this invention, the difference in intensity may be provided in the radial direction to enlarge the decision area in the angular direction and improve the receiver sensitivity.

Figure 11:
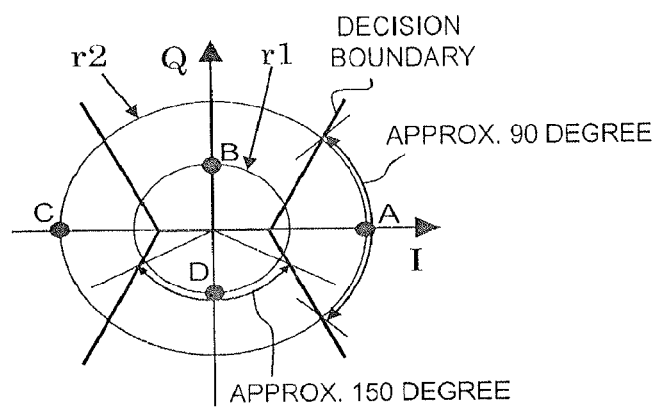
FIG. 11 is an explanatory diagram illustrating a signal constellation and a decision area for a received symbol based on the Euclidean distance according to the conventional technology of the 4QAM modulation according to the fourth embodiment of this invention.

FIG. 11 is an explanatory diagram illustrating a signal constellation and a decision area for a received symbol based on the Euclidean distance according to the conventional technology of the 4QAM modulation according to the fourth embodiment of this invention.

In the decision areas illustrated in FIG. 11, the width in the angular direction of each of the decision areas for the signal points B and D on the inner circumference (radius: r1) is about 150 degrees, and the width in the angular direction of each of the decision areas for the signal points A and C on the outer circumference (radius: r2) is about 90 degrees. Therefore, with the 4QAM signal according to this embodiment, compared to the conventional QPSK signal, the width in the angular direction of the decision areas on the inner circumference is improved. Meanwhile, the bold lines in FIG. 10 show an example in which the width of the decision areas in the angular direction is further enlarged to 180 degrees on the inner circumference and to 160 degrees on the outer circumference. As described above, in the multilevel transmission system having relatively large phase noise as in this invention, the receiver sensitivity can be significantly improved by combining amplitude modulations and enlargement of the decision areas in the angular direction.

Figure 12A:
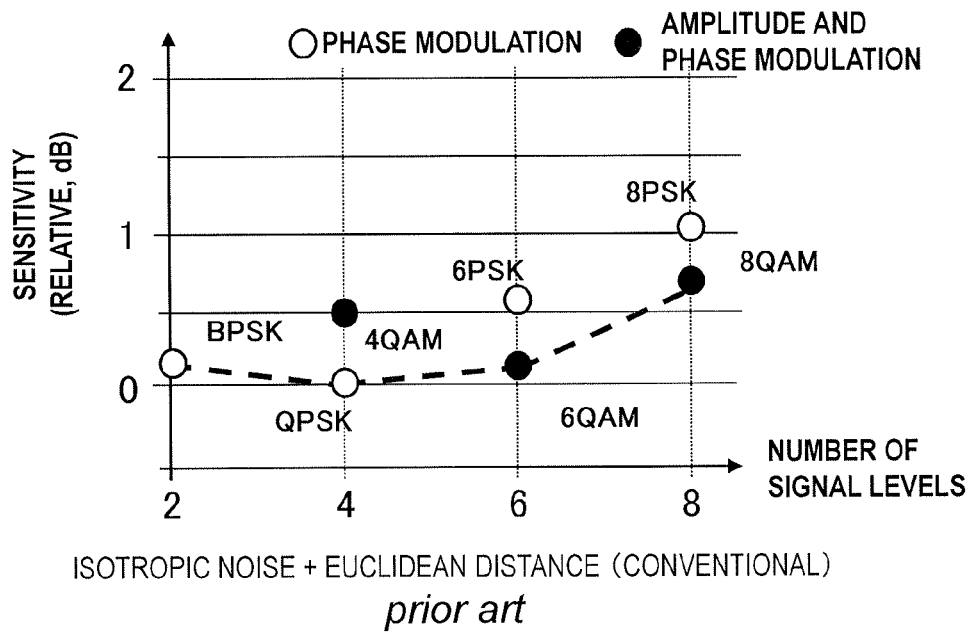
FIG. 12A is an explanatory diagram illustrating theoretical sensitivities of the modulation methods according to the conventional technologies.
Figure 12B:
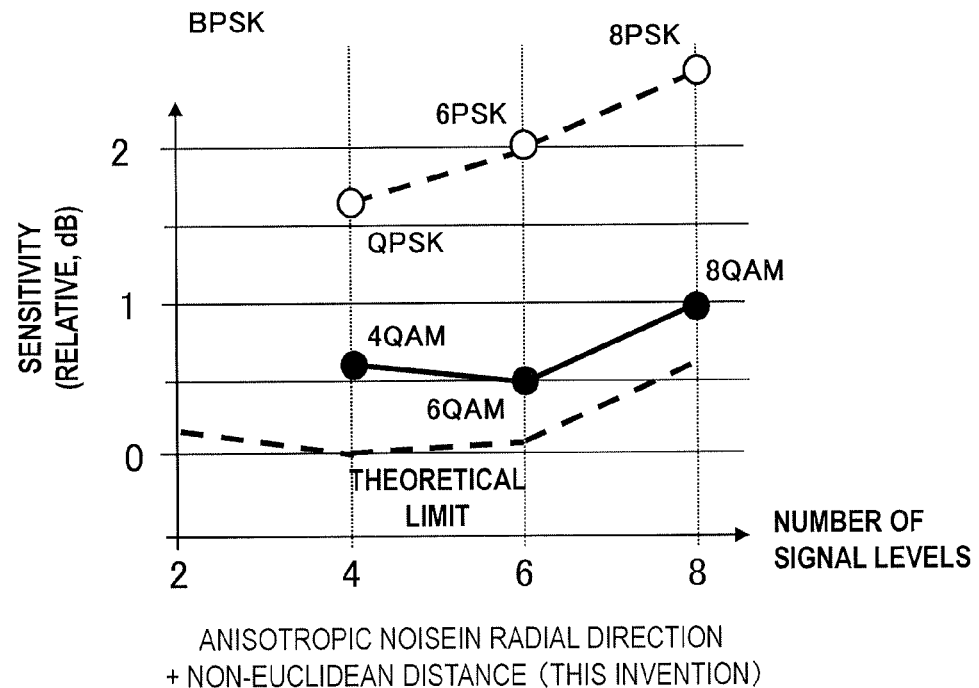
FIG. 12B is an explanatory diagram illustrating theoretical sensitivities of the modulation methods according to the fourth embodiment of this invention.

FIG. 12A is an explanatory diagram illustrating theoretical sensitivities of the modulation methods according to the conventional technologies, and FIG. 12B is an explanatory diagram illustrating theoretical sensitivities of the modulation method according to the fourth embodiment of this invention.

FIG. 12A illustrates the theoretical sensitivities of the conventional optical multilevel transmissions in a case where noise of the received signal is isotropic on a two-dimensional plane. FIG. 12A is a result obtained by using the receiver sensitivity of the QPSK as a reference (0 dB) and the axis of abscissa as the number of signal points (number of multiple levels) of the multilevel signals to numerically calculate receiver OSNR sensitivities of the binary to eight-level modulation method in a relative manner. As the number of multiple levels is increased, the number of signal points arranged on the two-dimensional plane becomes larger and the distance between the signal points becomes closer, to thereby degrade the receiver sensitivity in inverse proportion to the distance. On the other hand, as the number of multiple levels is increased, the amount of information per symbol of the multilevel signals increases. Therefore, in this calculation, the information transmission speed is fixed, to thereby include the effect that as the number of multiple levels is increased, the modulation speed is reduced and consequently the receiver OSNR sensitivity is improved. It should be noted that this calculation also includes a transmission waveform distortion (assuming the intersymbol interference to be about 5%), and as the number of multiple levels is increased and the distance between the signal points becomes smaller, the effect of the intersymbol interference increases and excessive degradation of the receiver sensitivity occurs.

For example, the QPSK-modulated signal has substantially the same sensitivity as the BPSK-modulated signal. The sensitivities of the phase modulations up to 8PSK are indicated by white circles, of which the QPSK modulation is most advantageous. On the other hand, black circles indicate 4QAM, 6QAM, and 8QAM modulations using the phase modulation and the amplitude modulation in combination. For example, a signal constellation of the 6QAM modulation is the signal constellation illustrated in FIG. 7A, and the receiver sensitivity is slightly degraded than the QPSK modulation. Further, as to the 4QAM modulation, the distance between the signal points becomes smaller than that in the case of the QPSK modulation when the amplitude modulation is added, and hence the receiver sensitivity is degraded than the QPSK modulation. The above-mentioned results show that, of the conventional optical multilevel modulations, the QPSK modulation is the most advantageous in terms of the receiver sensitivity.

In contrast, in the multilevel transmission system having the anisotropic noise in which the phase noise is larger than the amplitude noise according to this invention, the optimum transmission format varies greatly as illustrated in FIG. 12B. For the four-level to eight-level phase modulation methods (white circles), the enlargement of the decision areas according to this invention cannot be performed, and hence the resistance to the phase noise is low and the receiver sensitivity is significantly degraded.

Further, the 4QAM to 8QAM modulations indicated by black circles are examples to which the introduction of the amplitude modulation and the enlargement of the decision areas in the angular direction according to this invention are applied (the distance between the signal points is defined by the non-Euclidean distance). It can be seen that, when the phase modulation and the amplitude modulation are used in combination and the decision areas are enlarged in the angular direction, the resistance to phase noise is improved, with the result that the 4QAM or 6QAM modulation gives the optimum receiver sensitivity. It should be noted that, in the figure, the results of the phase modulation methods illustrated in FIG. 12A are shown as theoretical limits by a broken line. The optimal receiver sensitivity according to this invention is slightly degraded than the theoretical limits (in this embodiment, about 0.5 dB), which is an inevitable degradation due to making the noise anisotropic. This format has a feature that a sensitivity far better than the conventional QPSK modulation is obtained under the anisotropic noise.

FIG. 13A is a block diagram illustrating a configuration of the symbol decision circuit 233 which uses the amplitude-weighted non-Euclidean distance according to the fourth embodiment of this invention.

For example, in a case where the 6QAM modulation is used, the symbol decision circuit 233 illustrated in FIG. 13A decides which of the six symbols (A to F) of the 6QAM signal an input digitally-sampled and demodulated optical field 235 belongs, and outputs the decision result as a multilevel symbol string 234. Inside this circuit, a 6QAM modulation decision table 236 is provided, and the table is referenced based on the quadrature component of the input demodulated optical field to obtain the decision result.

FIG. 13B is an explanatory diagram illustrating an internal configuration of the decision table 236 according to the fourth embodiment of this invention.

As illustrated in FIG. 13B, it is sufficient when there is provided a table in which decision results are filled depending on the values of the quadrature component of the optical field. In this example, when (I,Q)=(5,3) is input as the demodulated optical field 235, for example, a symbol B is output as the decision result.

In the above-mentioned example, the demodulated optical field 235 is in a Cartesian coordinate representation, but the demodulated optical field 235 may equally be in a polar coordinate representation. Further, it is also possible to perform a complementary computation and approximation operation as needed, or to use the symmetry on the two-dimensional plane to compress the necessary table size. Further, in this example, the symbol name is written in the decision table 236, but other information corresponding to the decision result, such as a symbol number and a bit string corresponding to the symbol, may be used.

Further, instead of the above-mentioned multilevel decision table 236, a circuit for performing decision operation may be provided. An example of such operation may be a mode involving, for example, calculating a non-Euclidean distance d(X,Y) for every symbol Y=A to F of an input signal point X, and outputting the symbol Y that gives the minimum d(X,Y). It is also possible to perform approximation operation as appropriate, or to adapt a decision circuit for the multilevel signals, which is widely used in wireless multilevel communication or the like. Further, a configuration is also possible in which the decision tables or the amplitude weights for the non-Euclidean distance are switched depending on the noise distribution of the signal points.

FIG. 14A is a block diagram illustrating a configuration of the multilevel encoder 230 according to the fourth embodiment of this invention.

In a case where the 6QAM modulation is used, for example, the binary digital information signal 201 (b1, b2, b3) is input as a time-series bit string from a plurality of parallel electric circuits to the multilevel encoder 230 of FIG. 14A, several multilevel symbols are allocated to those several bits, and the Cartesian coordinate components on the two-dimensional plane are output as a complex multilevel information signal 238 according to this invention. This allocation may be realized by using, for example, a 6QAM modulation mapping table 237.

FIG. 14B is an explanatory diagram illustrating the 6QAM modulation mapping table 237 according to the fourth embodiment of this invention.

This embodiment describes an example in which two 6QAM symbols are allocated to a 5-bit information signal b5 to b1. The 6QAM modulation uses six symbols, and hence information of Log 2(6)=2.58 bits may be transmitted in one symbol. Then, one set of two 6QAM symbols results in 5.16 bits, and hence binary information of 5 bits may be transmitted. Specifically, as illustrated in FIG. 14B, for a 5-bit binary information string b5 to b1, which has 32 states, two 6QAM signals AA to FA may be paired and output. For example, in a case of a binary information string b5 to b1=11110, 6QAM symbols F and A are paired and output. In this example, of the 6QAM signal pairs, combinations FC to FF are unused. The two 6QAM signals may be sequentially transmitted from a multilevel optical transmitter, or may be output from multilevel optical transmitters corresponding to two polarization states X and Y, respectively, in the polarization multiplexing, which is described below.

It should be noted that the relationship between the bit string and the multilevel symbol is not limited to that described above, and a wide variation may be contemplated. For example, 3-bit information may be allocated to one 8QAM signal, four-bit information may be allocated to one 16QAM signal, or a bit error rate correction code may be allocated to some unused states. Further, the multilevel code to be used may be switched statically or dynamically, and in this invention, the amplitudes of the signal points are varied depending on the noise distribution, to thereby obtain optimal transmission characteristics at all times. This can be realized easily by overwriting the 6QAM modulation mapping table 237 or by providing and switching between a plurality of tables.

Figure 15:
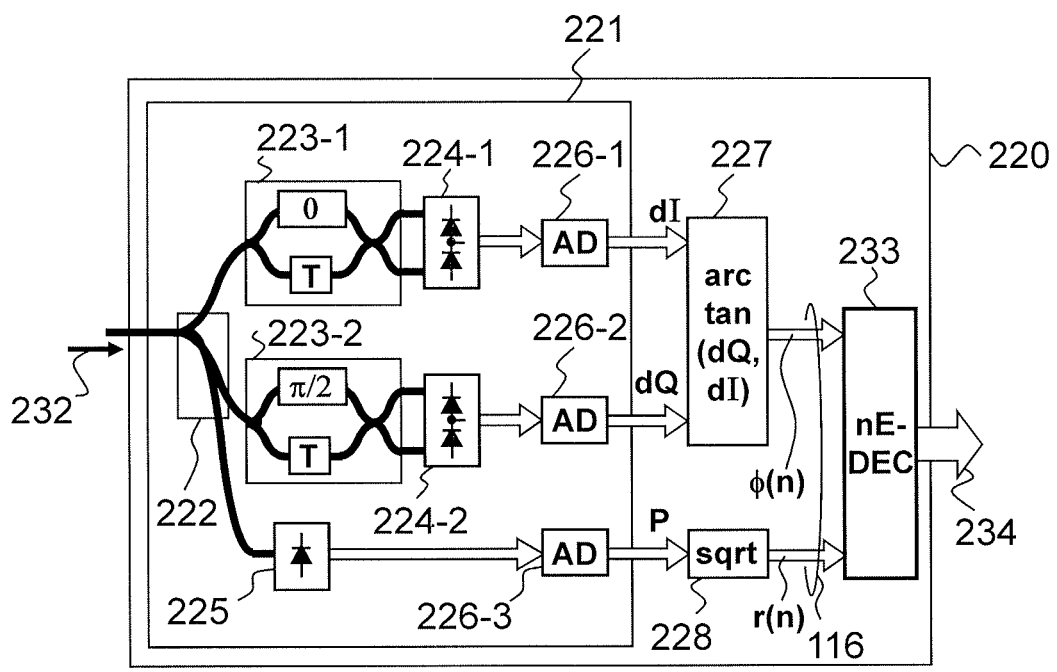
FIG. 15 is a block diagram illustrating a configuration of an incoherent optical field receiver according to a fifth embodiment of this invention.

FIG. 15 is a block diagram illustrating a configuration of an incoherent optical field receiver 220 according to a fifth embodiment of this invention.

This example is an example in which, from the incoherent optical field receiver 220 illustrated in FIG. 5, the Cartesian coordinate converter circuit 229 is omitted, and the demodulated received field 116 composed of phase difference information $\Delta\theta(n)$ output from the inverse tangent circuit 227 and amplitude information r(n) output from the square root circuit 228 in a polar coordinate representation is used as an input signal to the symbol decision circuit 233 which uses the non-Euclidean distance. As illustrated in FIGS. 6, 8, and 9, the decision areas for the multilevel signals according to this invention have rotational symmetry about the origin of the coordinate system. Therefore, not only the Cartesian coordinate converter circuit 229 may be removed by performing symbol decision directly with the polar coordinate representation as in this example, but also the operation and the table configuration inside the symbol decision circuit 233 which uses the non-Euclidean distance may be greatly simplified.

Figure 16:
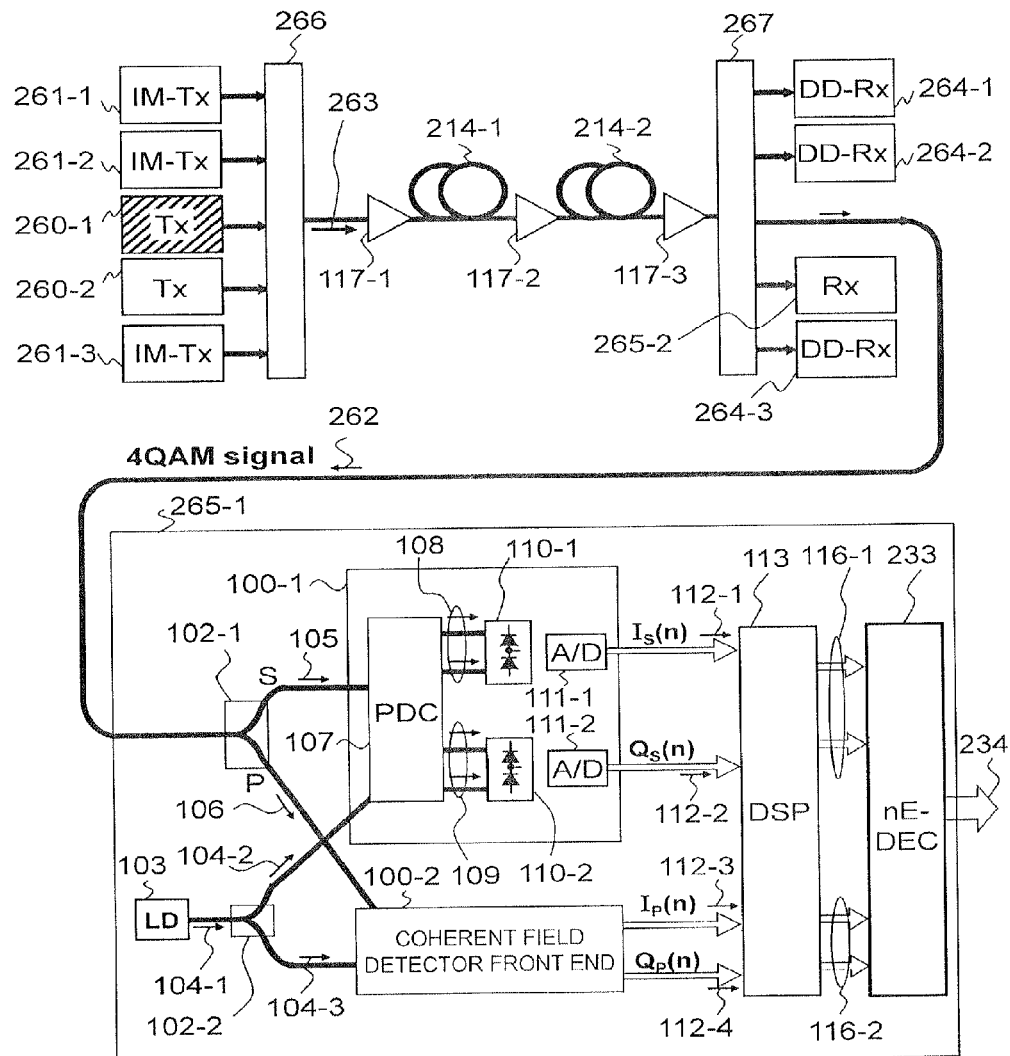
FIG. 16 is a block diagram illustrating a configuration of a coherent optical field transmission system according to a sixth embodiment of this invention.

FIG. 16 is a block diagram illustrating a configuration of a coherent optical field transmission system according to a sixth embodiment of this invention.

The above-mentioned embodiments are all directed to an incoherent transmission system, but this invention is also applicable to a coherent optical transmission system when the demodulated field signal has large anisotropic noise in the angular direction.

Factors causing such anisotropic noise may include firstly an effect of the cross-phase modulation effect (XPM) occurring in the optical fiber of an optical wavelength division multiplexing system. The XPM is one of the non-linear effects of the optical fiber, and is a phenomenon in which the refractive index of the optical fiber changes depending on the change in intensity of the optical signal having a certain wavelength and varies the phase of the optical signal having other wavelengths. For example, it is known that, when an optical signal having the intensity modulation component and an optical signal having a modulated phase component are simultaneously wavelength-division multiplexed, random phase variation occurs in the latter signal, to thereby significantly degrade transmission characteristics such as the receiver sensitivity and a transmission distance. Such optical signals having the intensity modulation may include an optical intensity modulation signal having a relatively low speed of, for example, 10 Gbits/sec, or the multilevel modulation signal of this invention per se. When the optical signal is degraded due to such XPM, the received signal that is received coherently has a large noise distribution in the angular direction, and hence this invention is applicable.

In FIG. 16, light beams output from 4QAM modulation optical multilevel transmitters 260-1 and 260-2 of this invention are wavelength multiplexed in a plurality of 10G intensity modulated optical transmitters 261-1 to 261-3 having different wavelengths and a wavelength multiplexer 266. A wavelength-multiplexed optical signal 263 is amplified in an optical amplifier 117-1, and then transmitted long-distance through a relay transmission path consisting of optical fiber transmission lines 214-1 and 214-2 and the optical amplifiers 117-2 and 117-3. The output wavelength-multiplexed light is demultiplexed by a wavelength demultiplexer 267, and 10G intensity modulated light beams are respectively received by 10G direct optical receivers 264-1 to 264-3. Further, in a 4QAM optical signal 262 of this invention, which is received by a 4QAM coherent optical field receiver 265-1, the XPM occurs due to the 10G intensity modulated light and 4QAM light having other wavelengths during the fiber transmission, and the noise in the angular direction is increased.

A 4QAM coherent optical field receiver 265 of this invention includes the symbol decision circuit 233 which uses the amplitude-weighted non-Euclidean distance to perform symbol decision for the received 4QAM signal based on the decision areas as illustrated in, for example, FIG. 10 described above. As a result, it is possible to reduce the effect of the phase noise due to the XPM and improve the reception quality of the multilevel signals.

It should be noted that factors causing excessive phase noise of the received signal as described above may include, for example, effects of phase fluctuation of the laser source in the optical multilevel transmitter 260-1 and the local laser source 103 on the receive side. Usually, the phase fluctuation of the light sources causes a relatively slow phase rotation (of several kHz to several tens of MHz) in the received signal. To avoid this, the digital signal processing circuit 113 performs digital signal processing for removing low-speed phase rotation. However, when the phase noise is large or the processing is incomplete, the fluctuation in the angular direction of the output signal becomes large so that this invention is applicable. Other than the above, excessive noise may be generated in the angular direction also because of the waveform distortion due to the non-linear effects of the optical fiber and chromatic dispersion, and/or a decision error, which renders application of this invention effective.

Figure 17:
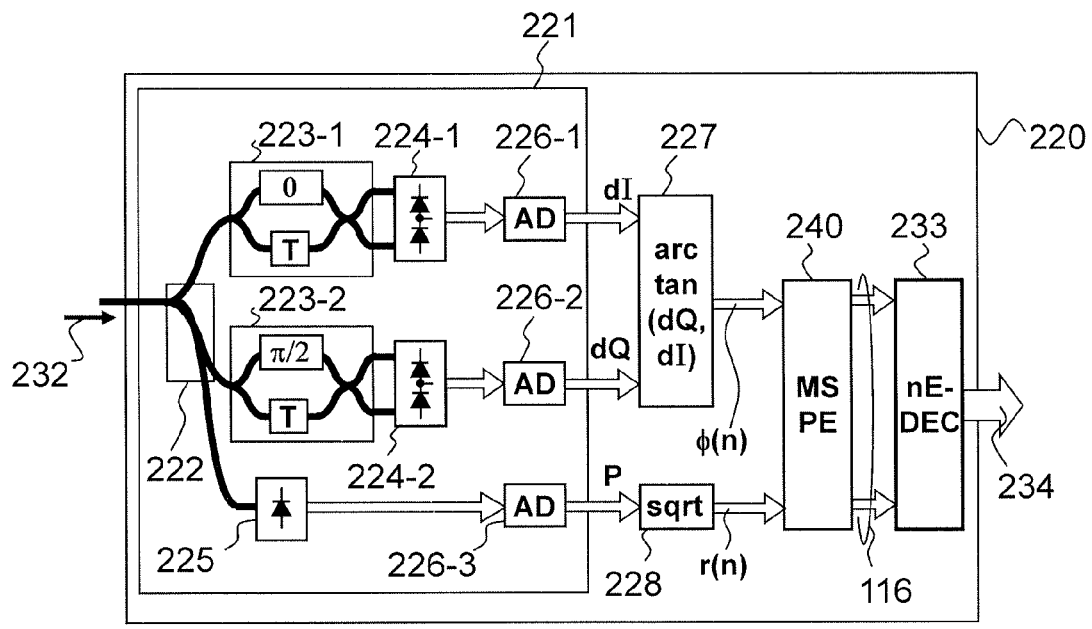
FIG. 17 is a configuration diagram of an incoherent optical field receiver according to an eighth embodiment of this invention.

FIG. 17 is a configuration diagram of an incoherent optical field receiver according to an eighth embodiment of this invention.

The incoherent optical field receiver illustrated in FIG. 17 is an example in which a multi-symbol phase estimation (MSPE) circuit 240 is provided therein as a phase noise suppression circuit, and after suppressing a part of the phase noise, a multilevel symbol decision is made by the symbol decision circuit 233 which uses the amplitude-weighted non-Euclidean distance. The MSPE is a method involving, in a receiver which uses the optical delay detection, storing past decision results of a plurality of symbols and averaging the errors to cancel a part of the excessive phase noise of the received signal. This method should be able to completely cancel the excessive phase noise when the past infinite number of symbols may be utilized retroactively. However, in reality, at most several to several tens of past symbols are used, and complete cancellation of excessive phase noise of the output signal is impossible. Therefore, both this method and this invention are used in combination so that a part of the phase noise is suppressed by the MSPE processing and then the symbol decision using the amplitude-weighted non-Euclidean distance is performed, to thereby achieve still higher sensitivity. It should be noted that the method of suppressing a part of the phase noise is not limited to the MSPE method, and various methods such as averaging the phase fluctuations may be used, for example.

Figure 18:
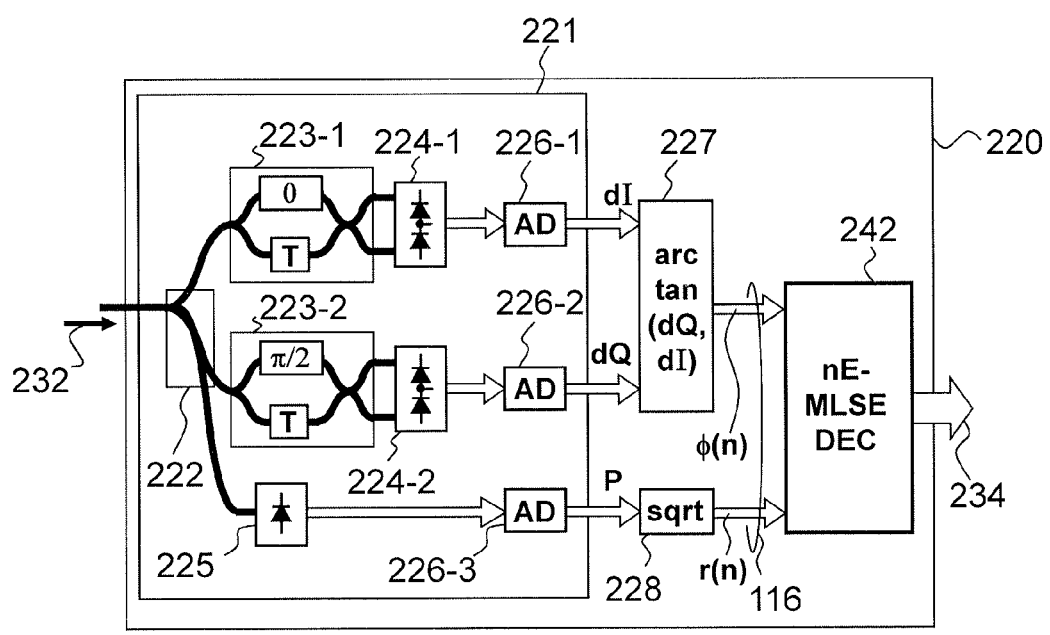
FIG. 18 is a configuration diagram of an incoherent optical field receiver according to a ninth embodiment of this invention.

FIG. 18 is a configuration diagram of an incoherent optical field receiver according to a ninth embodiment of this invention.

The incoherent optical field receiver illustrated in FIG. 18 includes an amplitude-weighted non-Euclidean most likelihood symbol estimation circuit 242 for symbol decision. Most likelihood sequence estimation (MLSE) is one symbol decision method which is widely used in wireless communication and the like and has high sensitivity and high distortion resistance. In a usual MLSE method, the Euclidean distances between transitions X1, X2 ... Xn of the signal points of the several received past symbols and all possible inter-symbol transitions Y1, Y2 ... Yn (sum of inter-symbol distances $\Sigma(Xi-Yi)^2$) are successively calculated, and the symbol transition with the smallest distance is output as the decision result. In this invention, the above-mentioned non-Euclidean distance is used instead of the Euclidean distance so that the distance is larger in the radial direction than in the angular direction, to thereby obtain the effects of this invention.

It should be noted that such application of the MLSE method is extremely useful when the received signal has large intersymbol interference. Therefore, the MLSE method is also extremely effective when applied to a case where the multilevel signals not subjected to phase pre-integration are incoherently received or a case where the multilevel signals degraded due to the optical fiber transmission are received through coherent field reception or incoherent field reception.

Figure 19:
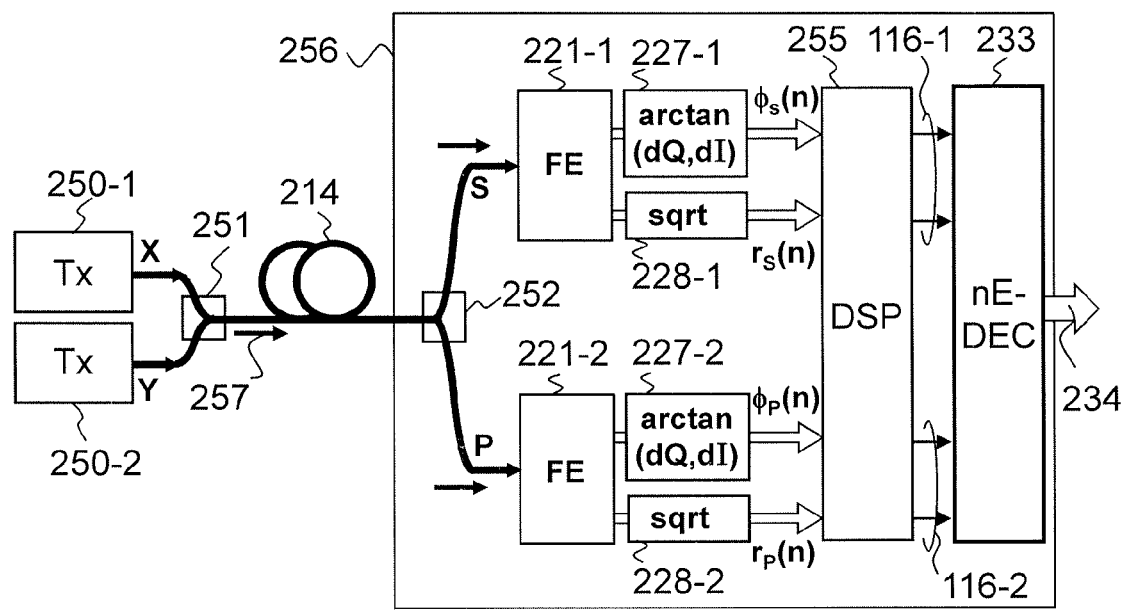
FIG. 19 is a diagram illustrating a configuration of a polarization multiplexing incoherent optical field transmission system according to a tenth embodiment of this invention.

FIG. 19 is a diagram illustrating a configuration of a polarization multiplexing incoherent optical field transmission system according to a tenth embodiment of this invention.

In the polarization multiplexing incoherent optical field transmission system illustrated in FIG. 19, light beams output from phase pre-integration 4QAM optical multilevel transmitters 250-1 and 250-2 of this invention are X polarization and Y polarization, respectively, which are orthogonally combined in a polarization beam combiner 251. Polarization-multiplexed 4QAM multilevel signal light 257 of this invention is transmitted through the optical fiber transmission line 214 to be received by a polarization multiplexing incoherent optical field receiver 256 of this invention. In the polarization multiplexing incoherent optical field receiver 256, the received light is split into two orthogonal polarization components S and P by a polarization beam splitter 252. Of the two orthogonal polarization components, the S component is detected by a coherent field detector front end 221-1 to extract a phase $\phi s(n)$ and an amplitude $rs(n)$ by an inverse tangent circuit 227-1 and a square root circuit 228-1, respectively. Similarly, a phase $\phi p(n)$ and an amplitude $rp(n)$ are extracted from the P component to be input to a polarization state converter 255. In the polarization state converter 255, two independent polarization components 116-1 (X component) and 116-2 (Y component) are extracted by orthogonal combination of the phase and the amplitude and by matrix operation. Then, the symbol decision circuit 233 which uses the amplitude-weighted non-Euclidean distance according to this invention performs symbol decision of the two components, and outputs the multilevel symbol string 234 as the decision result. By thus using the polarization multiplexing in combination in this invention, it is possible to realize optical multilevel transmission attaining both the high spectrum utilization efficiency and the high resistance to the phase noise.

What is claimed is:

1. An optical multilevel transmission system, comprising:
    at least one optical multilevel transmitter for transmitting an optical multilevel signal obtained by modulating both a phase and an amplitude on a complex optical field with an information signal; and
    an optical multilevel receiver for receiving the optical multilevel signal and demodulating the received optical multilevel signal on a complex plane,
    the received optical multilevel signal having a larger noise in an angular direction than in a radial direction,
    wherein the at least one optical multilevel transmitter performs phase pre-integration signal processing of integrating phase components of the optical multilevel signal at every time T in advance on the optical multilevel signal, wherein the optical multilevel signal is an optical multilevel QAM signal which is processed by the phase pre-integration signal processing, wherein the optical multilevel receiver includes a light intensity receiver and at least two optical delay detection receivers with a delay time, wherein the optical multilevel receiver directly detects and receives a light intensity of the optical multilevel signal by using the light intensity receiver and a phase difference between the times T by using the optical delay detection receivers, wherein the optical multilevel receiver sets, in a symbol decision of the directly detected and received optical multilevel signal demodulated on the complex plane, for positions of all or some of ideal signal points, a width in the angular direction of a decision area, to which each of the ideal signal points belongs and which is measured along a circumference of a circle centered at an origin and passing through the center of the each of the ideal signal points, larger than a width in the angular direction of a decision area defined based on a Euclidean distance, and wherein the optical multilevel receiver calculates a non-Euclidean distance by weighting the received optical multilevel signal so that the complex optical field has a distance in the radial direction that is larger than a distance in the angular direction.

2. The optical multilevel transmission system according to claim 1, further comprising an optical fiber transmission line, which serves as a transmission path for the optical multilevel signal, wherein the optical multilevel receiver receiving the optical multilevel signal transmitted through the optical fiber transmission line and demodulating the received optical multilevel signal on the complex plane, wherein the at least one optical multilevel transmitter uses, as a multilevel modulation code, one of 6QAM modulation in which a difference in intensity is provided between adjacent ideal signal points in six-level phase modulation with a phase interval of 60 degrees, and 4QAM modulation in which a difference in intensity is provided between adjacent ideal signal points in four-level phase modulation with a phase interval of 90 degrees.

3. The optical multilevel transmission system according to claim 1, wherein the at least one optical multilevel transmitter uses, as a multilevel modulation code, one of 6QAM modulation in which a difference in intensity is provided between adjacent ideal signal points in six-level phase modulation with a phase interval of 60 degrees, and 4QAM modulation in which a difference in intensity is provided between adjacent ideal signal points in four-level phase modulation with a phase interval of 90 degrees.

4. The optical multilevel transmission system according to claim 1, wherein the optical multilevel signal is wavelength-multiplexed with another optical signal having an intensity modulation component, and then transmitted to the optical multilevel receiver.

5. The optical multilevel transmission system according to claim 1, wherein the optical multilevel receiver comprises a phase noise removing circuit for reducing phase noise.

6. The optical multilevel transmission system according to claim 1, wherein the optical multilevel transmission system includes two of the optical multilevel transmitter, wherein the two of the optical multilevel transmitters output two of the optical multilevel signals modulated with different information signals, wherein the output two of the optical multilevel signals are polarization-multiplexed with two orthogonal polarization states for transmission, and wherein the optical multilevel receiver subjects the polarization-multiplexed optical multilevel signals to polarization diversity reception and polarization beam splitting.

7. The optical multilevel transmission system according to claim 1, wherein the optical multilevel receiver includes a local light source, and wherein the optical multilevel receiver coherently detects and receives an inphase component and a quadrature component of the complex optical field of the optical multilevel signal.

8. The optical multilevel transmission system according to claim 1, wherein the optical multilevel receiver performs, in the symbol decision of the received optical multilevel signal, most-likelihood sequence estimation using a non-Euclidean distance weighted so that an optical field distance is larger in the radial direction than in the angular direction.

* * * * *